United States Patent
Kamiyama et al.

[11] Patent Number: 5,932,301
[45] Date of Patent: Aug. 3, 1999

[54] INFORMATION RECORDING MEDIUM AND INFORMATION RECORDING AND REPRODUCING METHOD

[75] Inventors: Hironori Kamiyama; Yudai Yamashita, both of Tokyo, Japan

[73] Assignee: Dai Nippon Printing Co., Ltd., Tokyo, Japan

[21] Appl. No.: 08/933,747

[22] Filed: Sep. 23, 1997

Related U.S. Application Data

[62] Division of application No. 08/585,640, Jan. 16, 1996, Pat. No. 5,693,421, which is a division of application No. 08/170,792, Dec. 21, 1993, abandoned.

[30] Foreign Application Priority Data

| Dec. 22, 1992 | [JP] | Japan | 4-342590 |
| Dec. 22, 1992 | [JP] | Japan | 4-342592 |
| Jan. 12, 1993 | [JP] | Japan | 5-003048 |

[51] Int. Cl.⁶ ............................................ B05D 3/06
[52] U.S. Cl. .................... 427/558; 427/58; 427/256; 428/1; 428/195; 428/696; 428/913
[58] Field of Search ........................... 427/58, 256, 558; 428/1, 195, 696, 913

[56] References Cited

U.S. PATENT DOCUMENTS

| 3,620,889 | 11/1971 | Baltzer . |
| 3,731,986 | 5/1973 | Fergason . |
| 3,935,337 | 1/1976 | Taylor . |
| 4,241,984 | 12/1980 | Leibowitz . |
| 4,277,786 | 7/1981 | Waldron . |
| 4,488,491 | 12/1984 | Okubo . |
| 4,752,820 | 6/1988 | Kuroiwa et al. . |
| 5,032,007 | 7/1991 | Silverstein et al. . |
| 5,296,952 | 3/1994 | Takatsu et al. . |
| 5,693,421 | 12/1997 | Kamiyama et al. ................ 428/411.1 |

Primary Examiner—Michael Lusignan
Attorney, Agent, or Firm—Sughrue, Mion, Zinn, Macpeak & Seas, PLLC

[57] ABSTRACT

A first information recording medium (shown in Fig. 1(a)) has an electrode layer (13), and an information recording layer (11) provided on the electrode layer by coating a mixed solution of a liquid crystal, a multifunctional ultraviolet curing resin material whose parameter, which is expressed by the average molecular weight divided by the average functional group, is not larger than 160, and a fluorocarbon surface-active agent, and then curing the coating by irradiation with ultraviolet rays, thereby forming an ultraviolet curing resin skin layer having no liquid crystal phase on the outer surface of the information recording layer. A second information recording medium (shown in Fig. 1(b)) further has a patterned electrode layer (13') provided on the information recording layer (11) of the first information recording medium. A third information recording medium (shown in FIG. 4(a)) has an electrode layer (13"), a photoconductive layer (14), an information recording layer (11) including a liquid crystal phase and a resin phase, a resin layer (12), and an electrode layer (13), which are successively provided one on top of another, wherein at least one of the electrode layers is transparent. A fourth information recording medium (shown in FIG. 4(b)) further has an insulating layer (16) provided between the photoconductive layer (14) and the information recording layer (11) in the third information recording medium.

6 Claims, 4 Drawing Sheets

FIG. 3
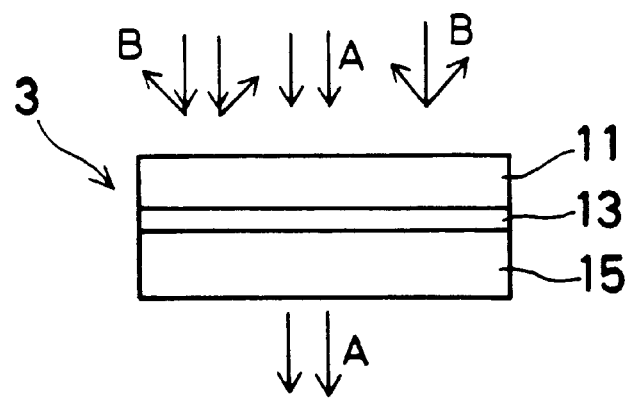
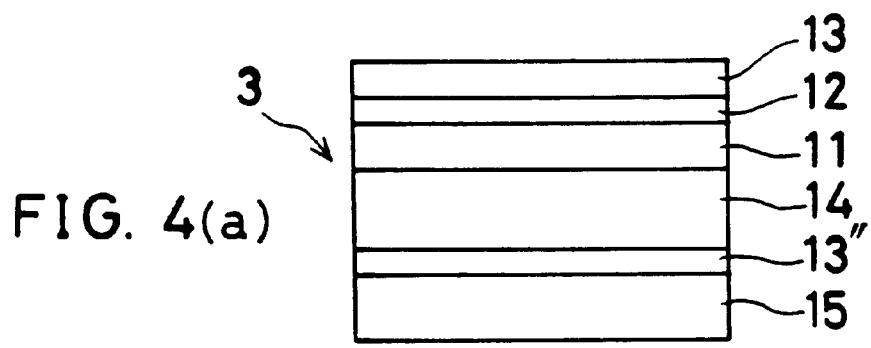
FIG. 4(a)
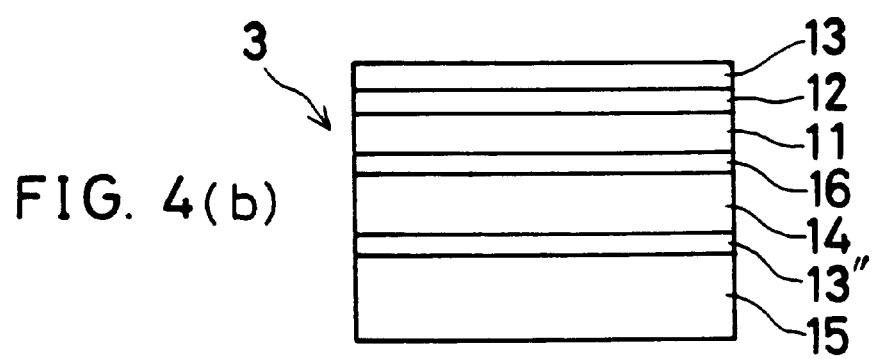
FIG. 4(b)

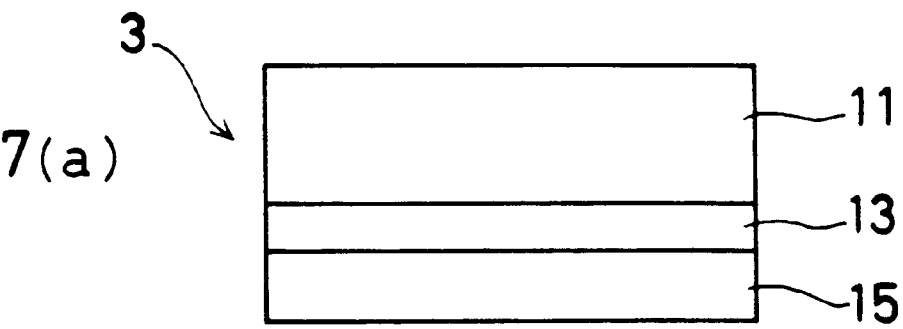
FIG. 7(a)
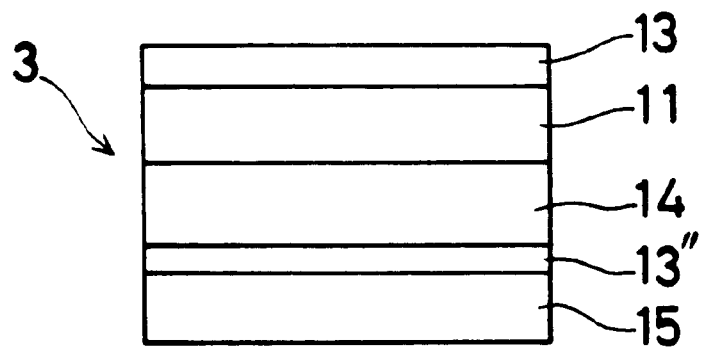
FIG. 7(b)
FIG. 8
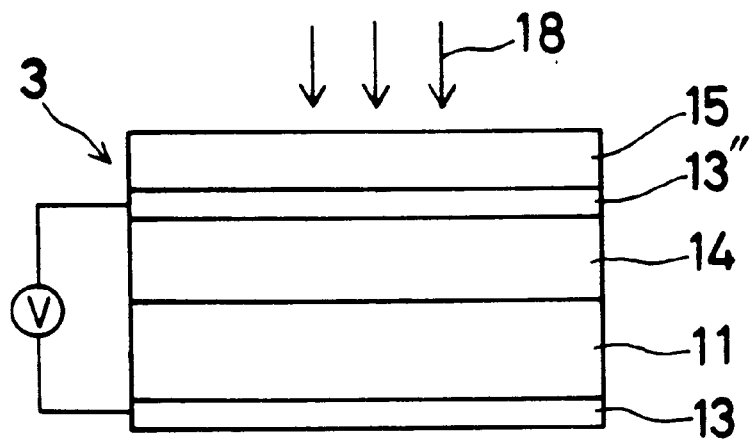

INFORMATION RECORDING MEDIUM AND INFORMATION RECORDING AND REPRODUCING METHOD

This is a divisional of application Ser. No. 08/585,640 filed Jan. 16, 1996 now U.S. Pat. No. 5,693,421, which is a divisional of application Ser. No. 08/170,792 filed Dec. 21, 1993, abandoned.

BACKGROUND OF THE INVENTION

The present invention relates to an information recording medium capable of recording, storing and reproducing electrostatic information in the form of visible information by using an ultraviolet curing resin material having a liquid crystal material dispersed and fixed therein. The present invention also relates to an information recording and reproducing method that employs the above-described information recording medium.

Liquid crystal display devices have been used as display devices for office automation equipment such as word processors, laptop computers, etc. These liquid crystal display devices have a liquid crystal layer sandwiched between two transparent substrates, e.g., glass or plastic substrates, provided with respective transparent electrode films. A voltage is applied between the two electrodes by using either simple- or active-matrix drive, thereby displaying information, e.g., an image.

This type of liquid crystal display device includes typical TN and STN liquid crystal display devices and also those based on dynamic scattering mode, i.e., liquid crystal display devices which operate on the current effect, and those which utilize the cholesteric-nematic phase transition. Recently, liquid crystal display devices having a liquid crystal material combined with a polymer have also been used. A liquid crystal display device having a nematic liquid crystal dispersed and fixed in a polymeric resin material displays information according to whether it is transparent or opaque by making use of the phenomenon explained below: The ordinary ray refractive index of the liquid crystal material and the refractive index of the polymeric resin material have previously been made equal to each other. When a voltage is applied to the device to align the molecules of the liquid crystal material in the direction of the voltage application, the device becomes transparent. When no voltage is applied to the device, the molecules of the liquid crystal material are irregular in orientation. Consequently, light is scattered at the interface between the liquid crystal and the polymeric resin material or in the liquid crystal dispersed and fixed therein. Thus, the liquid crystal display device becomes opaque.

A liquid crystal display device having a nematic liquid crystal dispersed and fixed in a polymeric resin material has the following advantageous features: the display area can be increased; the response time, particular, the rise time, is short; no polarizer is needed, and hence the light utilization efficiency is high; the viewing angle is wide and uniform; it has flexibility; and so forth. It has recently been reported that this type of liquid crystal display device is used as a lighting control sheet for a window, a projection-type display, etc. This type of liquid crystal display device has an advantage in that the decay time is as short as 1 ms to 30 ms, which is shorter than that of TN and STN display devices, which are most commonly used as projection-type displays and computer displays.

In a conventional liquid crystal display device having a nematic liquid crystal dispersed and fixed in a polymeric resin material, an AC voltage is applied between two electrodes sandwiching the nematic liquid crystal, and information is displayed and erased by on/off control of the voltage application. In this case, when the application of the AC voltage is cut off, i.e., when no voltage is applied, the device returns to the initial transmittance, that is, the opaque state, although there is a report stating that slight hysteresis is observed in the change of light transmittance relative to the applied voltage; therefore, there is a difference between the transmittance when the applied AC voltage is rising and the transmittance when the voltage is falling.

A common method of displaying information, e.g., an image, by a liquid crystal display device is to on/off control a liquid crystal material sandwiched between two matrix electrodes for each pixel. Other conventional displaying methods include one that employs an imagewise patterned electrode, and another wherein when a composite film of a polymer and a liquid crystal is to be formed, a polymeric material of the ultraviolet curing type, for example, is used and this is imagewise irradiated with ultraviolet rays. In these conventional methods, however, fixed information is displayed by on/off control.

Meantime, there are liquid crystal display devices having memory effect. One type of such liquid crystal display device uses cholesteric-nematic phase transition. This type of liquid crystal display device must have a sandwich structure in which a liquid crystal material is sandwiched between transparent electrodes formed with respective vertical alignment films. In this case, a proper electrode structure is required.

Recently, an information recording medium which uses a polymer dispersed liquid crystal in place of a liquid crystal layer in a liquid crystal cell has been developed. In such an information recording medium, a polymer dispersed liquid crystal is sandwiched between two substrates having respective ITO electrodes.

There has also been developed an information recording technique in which an information recording medium, which is composed of a substrate, an ITO electrode and a polymer dispersed liquid crystal layer, is disposed to face a photoelectric sensor composed of an electrode and a photoconductive layer, thereby forming an information recording system, and information light for exposure is applied to the information recording system with a voltage applied between the two electrodes, thereby allowing a voltage corresponding to the information light to be applied to the polymer dispersed liquid crystal layer, and thus recording the desired information in the form of liquid crystal alignment in the polymer dispersed liquid crystal layer. In this case, when the liquid crystal dispersed in the resin material is a smectic liquid crystal, particularly large memory effect and orientational order parameter are obtained. Accordingly, even if the electric field is removed, the modulated alignment is maintained as it is. Thus, the recorded image can be read even after the information recording medium has been allowed to stand for a long time. Since the visible image recorded on the medium is erased by heating it to a temperature in the vicinity of the isotropic phase transition temperature of the liquid crystal, the information recording medium can be reused.

In this type of information recording medium, however, the liquid crystal oozes from the surface of the information recording layer, causing noise to be generated. Therefore, it is necessary to suppress oozing of the liquid crystal from the information recording layer surface. In addition, if the liquid crystal oozes out, an electrode layer which is provided on the surface of the information recording layer is likely to peel off. Thus, the conventional information recording medium is demanded to improve in durability during storage. Furthermore, if an electrode layer is provided on the information recording layer by vapor deposition, the surface of the information recording layer is also demanded to have durability, i.e., sputtering resistance.

In addition, the conventional information recording medium of the type in which information is recorded in the form of liquid crystal alignment in the polymer dispersed liquid crystal layer generally suffers from the problem that a satisfactorily high contrast cannot be obtained between recorded and unrecorded areas of the information recording layer, resulting in lack of signal.

It is a first object of the present invention to provide an information recording medium which is free from oozing of the liquid crystal from the surface of the information recording layer, superior in durability and capable of obtaining an image of high quality without occurrence of noise in information recording, and also provide an information recording and reproducing method that employs the above-described information recording medium.

It is a second object of the present invention to provide an information recording medium of the type described above, which enables information of high contrast ratio to be obtained.

SUMMARY OF THE INVENTION

The present invention provides an information recording medium having an electrode layer, and an information recording layer provided on the electrode layer and including a liquid crystal phase and an ultraviolet curing resin phase. The information recording layer is formed by coating a surface of the electrode layer with a mixed solution of a liquid crystal, a multifunctional ultraviolet curing resin material whose parameter, which is expressed by the average molecular weight divided by the average functional group, is not larger than 160, and a fluorocarbon surface-active agent, and then curing the coating by irradiation with ultraviolet rays, thereby forming an ultraviolet curing resin skin layer having no liquid crystal phase on the outer surface of the information recording layer.

In addition, the present invention provides an information recording and reproducing method which employs an information recording medium having an electrode layer, and an information recording layer provided on the electrode layer and including a liquid crystal phase and an ultraviolet curing resin phase. The information recording layer is formed by coating a surface of the electrode layer with a mixed solution of a liquid crystal, a multifunctional ultraviolet curing resin material whose parameter, which is expressed by the average molecular weight divided by the average functional group, is not larger than 160, and a fluorocarbon surface-active agent, and then curing the coating by irradiation with ultraviolet rays, thereby forming an ultraviolet curing resin skin layer having no liquid crystal phase on the outer surface of the information recording layer. The information recording medium is disposed to face a photoelectric sensor having a photoconductive layer provided on an electrode layer, either in or out of contact with each other, thereby forming an information recording system. Information light for exposure is applied to the information recording system with a voltage applied between the respective electrode layers of the information recording medium and the photoelectric sensor, thereby aligning the liquid crystal molecules in the liquid crystal phase in accordance with the applied information light, and thus effecting information recording. The recorded information is reproduced as visible information by transmitted or reflected light.

In addition, the present invention provides an information recording medium having a first electrode layer, an information recording layer provided on the first electrode layer and including a liquid crystal phase and an ultraviolet curing resin phase, and a second electrode layer provided on the information recording layer. At least one of the electrode layers is a transparent electrode layer formed on the information recording layer by vapor deposition. The information recording layer is formed by coating a surface of the electrode layer with a mixed solution of a liquid crystal, a multifunctional ultraviolet curing resin material whose parameter, which is expressed by the average molecular weight divided by the average functional group, is not larger than 160, and a fluorocarbon surface-active agent, and then curing the coating by irradiation with ultraviolet rays, thereby forming an ultraviolet curing resin skin layer having no liquid crystal phase on the outer surface of the information recording layer.

In addition, the present invention provides an information recording and reproducing method which employs an information recording medium having a first electrode layer, an information recording layer provided on the first electrode layer and including a liquid crystal phase and an ultraviolet curing resin phase, and a second electrode layer provided on the information recording layer. At least one of the electrode layers is a transparent electrode layer formed on the information recording layer by vapor deposition, and the information recording layer is formed by coating a surface of the electrode layer with a mixed solution of a liquid crystal, a multifunctional ultraviolet curing resin material whose parameter, which is expressed by the average molecular weight divided by the average functional group, is not larger than 160, and a fluorocarbon surface-active agent, and then curing the coating by irradiation with ultraviolet rays, thereby forming an ultraviolet curing resin skin layer having no liquid crystal phase on the outer surface of the information recording layer. According to the information recording and reproducing method, a voltage is applied in a pattern between the two electrode layers, thereby aligning the liquid crystal molecules in the liquid crystal phase in the pattern of the applied voltage, and thus effecting information recording. The recorded information is reproduced as visible information by transmitted or reflected light.

The first information recording medium of the present invention retains the liquid crystal in the information recording layer so that no liquid crystal oozes out to the surface of the information recording layer. When this medium is used for an information recording method in combination with a photoelectric sensor, information recording can be effected on the surface of the information recording layer without disorder. Thus, it is possible to record electrostatic information without unevenness of the recorded image.

In the case of the second information recording medium of the present invention, since it is possible to prevent oozing of the liquid crystal from the surface of the information recording layer, even when an electrode layer, e.g., an ITO film, is formed on the information recording layer by vapor deposition or the like, the resulting electrode layer will not be wrinkled or cracked. Thus, it is possible to prevent deterioration of the electrical conductivity. In addition, since the electrode layer can be provided directly on the information recording layer, the gap between the two electrode layers can be made uniform.

In addition, the present invention provides an information recording medium having a first electrode layer, a photoconductive layer, an information recording layer, a resin layer, and a second electrode layer, which are successively provided one on top of another. At least one of the electrode layers is transparent, and the information recording layer includes a liquid crystal phase and a resin phase.

In addition, the present invention provides an information recording medium having a first electrode layer, a photoconductive layer, a transparent insulating layer, an information recording layer, a resin layer, and a second electrode layer, which are successively provided one on top of another. At least one of the electrode layers is transparent, and the information recording layer includes a liquid crystal phase and a resin phase.

In the above-described third and fourth information recording mediums, the information recording layer may contain a fluorocarbon surface-active agent.

Further, in the third and fourth information recording mediums, the information recording layer may be formed by coating a mixed solution of a liquid crystal and an ultraviolet curing resin material, and then curing the coating by irradiation with ultraviolet rays, thereby forming a skin layer made only of the ultraviolet curing resin material on the outer surface of the information recording layer.

In addition, the present invention provides an information recording and reproducing method which employs an information recording medium having a first electrode layer, a photoconductive layer, an information recording layer, a resin layer, and a second electrode layer, which are successively provided one on top of another. At least one of the electrode layers is transparent, and the information recording layer includes a liquid crystal phase and a resin phase. According to the method, pattern exposure is carried out with a voltage applied between the two electrode layers, thereby aligning the liquid crystal molecules in the liquid crystal phase in the pattern of the exposure light, and thus effecting information recording. The recorded information is reproduced as visible information by transmitted or reflected light.

In addition, the present invention provides an information recording and reproducing method which employs an information recording medium having a first electrode layer, a photoconductive layer, an insulating layer, an information recording layer, a resin layer, and a second electrode layer, which are successively provided one on top of another. At least one of the electrode layers is transparent, and the information recording layer includes a liquid crystal phase and a resin phase. According to the method, pattern exposure is carried out with a voltage applied between the two electrode layers, thereby aligning the liquid crystal molecules in the liquid crystal phase in the pattern of the exposure light, and thus effecting information recording. The recorded information is reproduced as visible information by transmitted or reflected light.

The third information recording medium of the present invention can prevent oozing of the liquid crystal from the information recording layer by the presence of the resin layer stacked on the information recording layer. It is therefore possible to effect information recording without occurrence of noise, which would otherwise be generated by oozing of the liquid crystal. In addition, when an electrode layer, e.g., an ITO electrode layer, is formed on the resin layer by vapor deposition or sputtering, even if there is no support, e.g., substrate, on the electrode layer, the required supporting properties can be satisfactorily obtained. Furthermore, a satisfactorily high hardness is given to the surface of the information recording layer, and the information recording medium is improved in durability. In comparison to an information recording medium having an ITO electrode layer formed directly on the information recording layer by vapor deposition, the third information recording medium has an advantage in that it is possible to prevent cracking of the ITO electrode layer due to oozing of the liquid crystal from the information recording layer surface and hence possible to prevent a lowering in electrical conductivity of the ITO electrode layer.

When the information recording layer is formed by using an ultraviolet curing resin material, a skin layer of the ultraviolet curing resin material can be formed as the outer surface layer of the information recording layer. Therefore, the information recording layer can contain a relatively large amount of liquid crystal. In addition, since the layer thickness can be reduced, the operating voltage can be set at a relatively low level. Thus, it becomes possible to form a visible image of high sensitivity, high contrast and high quality.

The fourth information recording medium of the present invention can eliminate the interaction between the photoconductive layer and the information recording layer by the presence of the insulating layer provided between these layers. Accordingly, it is possible to eliminate problems such as unevenness of the recorded image.

In addition, the present invention provides an information recording medium having an electrode layer, and an information recording layer provided on the electrode layer and including a liquid crystal phase and a resin phase. The liquid crystal phase contains a dichroic dye.

In addition, the present invention provides an information recording medium having a first electrode layer, a photoconductive layer, an information recording layer, and a second electrode layer, which are successively provided one on top of another. At least one of the electrode layers is transparent, and the information recording layer includes a liquid crystal phase and a resin phase. The liquid crystal phase contains a dichroic dye.

In the above-described fifth information recording medium of the present invention, a dichroic dye is contained in the information recording layer, which includes a liquid crystal phase and a resin phase. Accordingly, in comparison to an information recording medium having an information recording layer which includes a liquid crystal phase and a resin phase and contains no dichroic dye, the fifth information recording medium has an advantage in that, when no electric charge or electric field is applied thereto, the transmittance is becomes lower and the medium becomes opaque, whereas, when electric charge or electric field is applied thereto, not only the liquid crystal phase (host) but also the dichroic dye (guest) itself is aligned, and therefore the absorbances in the two different states can be made even more largely different from each other. Thus, the information recording medium is improved in contrast.

In the above-described sixth information recording medium, a dichroic dye is contained in the information recording layer, which includes a liquid crystal phase and a resin phase. In addition, the medium has a photoconductive layer. Therefore, the information recording medium is capable of information recording by itself.

In the first to sixth information recording mediums of the present invention, the information recording layer is composed of a liquid crystal phase and a resin phase, and electro-optic effect can readily be obtained. Accordingly, analog information can be recorded and stored. In addition, since the information recording layer can be made uniform and reduced in thickness by coating technique, an information recording medium of large area can be produced, and it is possible to record and reproduce an image of high resolution. In addition, by making the refractive indices of the liquid crystal and resin phases in the information recording layer approximately equal to each other, the information recording layer can be selectively made opaque and transparent as follows: When no electric field is applied thereto by information electric charge, the information recording layer is opaque due to light scattering, whereas, when an electric field is applied to the information recording layer, the molecules in the liquid crystal phase are aligned, thus enabling the information recording region to become transparent. No polarizer is needed when the recorded information is reproduced, and hence the optical system required for reading can be simplified.

BRIEF DESCRIPTION OF THE DRAWINGS

FIG. 3 is a view for explanation of a method of reproducing information recorded on the first and fifth information recording mediums of the present invention.

FIG. 4 schematically shows third and fourth information recording mediums of the present invention, in which (a) is a sectional view of the third information recording medium, and (b) is a sectional view of the fourth information recording medium.

FIG. 7 schematically shows fifth and sixth information recording mediums of the present invention, in which (a) is a sectional view of the fifth information recording medium, and (b) is a sectional view of the sixth information recording medium.

FIG. 8 is a view for explanation of a method of recording information on the sixth information recording medium of the present invention.

DESCRIPTION OF THE PREFERRED EMBODIMENTS

Figure 1A:
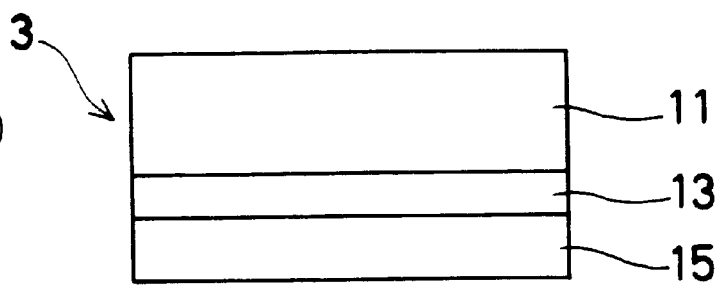
FIG. 1 schematically shows first and second information recording mediums of the present invention, in which (a) is a sectional view of the first information recording medium, and (b) is a sectional view of the second information recording medium.

First of all, the first information recording medium of the present invention will be described below. FIG. 1(a) is a sectional view schematically showing the first information recording medium. In the figure, reference numeral 3 denotes an information recording medium, 11 an information recording layer, 13 an electrode layer, and 15 a substrate.

The information recording layer 11 has a structure which includes a liquid crystal phase and a resin phase. Examples of liquid crystals usable in the present invention include a smectic liquid crystal, a nematic liquid crystal, and a mixture of these liquid crystals. However, it is preferable to use a smectic liquid crystal or a mixture of smectic and nematic liquid crystals from the viewpoint of retaining the liquid crystal alignment and holding the recorded information permanently, that is, from the viewpoint of memory effect.

Examples of smectic liquid crystals usable in the present invention are as follows: cyanobiphenyl, cyanoterphenyl and phenylester liquid crystals, which present smectic phase at ordinary temperature (25°) and in which the end group of a liquid crystalline substance has a long carbon chain; liquid crystal substances that present smectic A phase, e.g., fluorine liquid crystal; liquid crystal substances that present smectic C phase, which are used as ferroelectric liquid crystals or antiferroelectric liquid crystals; and liquid crystal substances that present smectic H, G, E or F phase. Smectic liquid crystals are superior in memory effect, that is, the ability to retain the liquid crystal alignment after information has been recorded, and to hold the recorded information permanently.

A nematic liquid crystal mixed with a smectic liquid crystal is one which shows nematic phase at ordinary temperature (25° C.). It is possible to use known nematic liquid crystals, for example, Schiff's base, azoxy, azo, phenyl benzoate, cyclohexyl phenyl ester, biphenyl, terphenyl, phenylcyclohexane, phenylpyridine, phenyloxazine, polycyclic ethane, phenylcyclohexene, cyclohexylpyrimidine, phenyl and tolan liquid crystals. It should be noted that it is preferable to select a liquid crystal material having higher anisotropy of refractive index with a view to obtaining a higher contrast. It is preferable to mix together a nematic liquid crystal and a smectic liquid crystal in a weight ratio of from 5:95 to 20:80. If the amount of nematic liquid crystal is less than 5% by weight, the variation of light transmittance is large, whereas, if it exceeds 20% by weight, the memory effect is degraded, and the variation of light transmittance also becomes large. By using a mixed phase of nematic and smectic liquid crystals, the liquid crystal distribution in the information recording layer can be made uniform and the transmittance variation can be minimized in comparison to an information recording layer formed of a nematic or smectic liquid crystal alone, although the reason for this is not clear.

Examples of materials which are preferable to use for forming the resin phase are ultraviolet curing resin materials which are compatible with a liquid crystal material or a common solvent therewith in the form of a monomer or an oligomer. Examples of such ultraviolet curing resin materials are multifunctional ultraviolet curing resin materials whose parameter, which is expressed by the average molecular weight divided by the average functional group, is not larger than 160, preferably in the range of 80 to 150, such as acrylic and methacrylic esters.

Specific examples of the above-described ultraviolet curing resin materials include multifunctional monomers and multifunctional urethane and ester oligomers, e.g., dipentaerythritol hexaacrylate,. trimethylolpropane triacrylate, polyethylene glycol diacrylate, polypropylene glycol diacrylate, isocyanuric acid (ethylene oxide modified) triacrylate, dipentaerythritol pentaacrylate, dipentaerythritol tetraacrylate, neopentyl glycol diacrylate, hexanediol diacrylate, etc. When an information recording layer is formed by using an ultraviolet curing resin as a resin material, the resulting information recording layer has such a structure that the surface of the layer is covered with the ultraviolet curing resin material, and the inside of the layer is filled with the liquid crystal phase and the resin particle phase. The present invention is made on the basis of the finding that when a multifunctional ultraviolet curing resin material whose parameter, which is expressed by the average molecular weight divided by the average functional group, is not larger than 160 is used as a resin phase forming material, it is possible to form an information recording layer which is superior in durability and free from oozing of the liquid crystal in comparison to an information recording layer formed using an ultraviolet curing resin material in which the above-described parameter exceeds 160.

In addition, by making the refractive indices of the liquid crystal and resin phases in the information recording layer approximately equal to each other, the information recording layer can be selectively made opaque and transparent as follows: When no electric field is applied thereto, the information recording layer is opaque due to light scattering, whereas, when an electric field is applied to the information recording layer, the molecules in the liquid crystal phase are aligned, thus enabling the information recording region to become transparent. No polarizer is needed when the recorded information is reproduced, and hence the optical system required for reading can be simplified.

As to the solvent, any common solvent can be used. However, it is preferable to use a solvent whose relative evaporation rate for n-butyl acetate is smaller than 2, for example, hydrocarbon solvents represented by xylene, halogenated hydrocarbon solvents represented by chloroform, alcohol derivative solvents represented by methyl cellosolve, and ether solvents represented by dioxane.

Examples of photo-curing agents usable in the present invention are 2-hydroxy-2-methyl-1-phenylpropane-1-one ("Darocure 1173", manufactured by Ciba-Geigy Ltd.), 1-hydroxycyclohexyl phenyl ketone ("Irgacure 184", manufactured by Ciba-Geigy Ltd.), 1-(4-isopropylphenyl)-2-hydroxy-2-methylpropane-1-one ("Darocure 1116", manufactured by Ciba-Geigy Ltd.), benzyl dimethyl ketal ("Irgacure 651", manufactured by Ciba-Geigy Ltd.), 2-methyl-1-[4-(methylthio)phenyl]-2-morpholinopropanone-1 ("Irgacure 907", manufactured by Ciba-Geigy Ltd.), a mixture of 2,4-diethylthioxanthone ("Kayacure DETX", manufactured by Nippon Kayaku Co., Ltd.) and p-dimethylamino ethyl benzoate ("Kayacure EPA", manufactured by Nippon Kayaku Co., Ltd.), and a mixture of isopropylthioxanthone ("Quantacure ITX", manufactured by Wordblekinsop Co., Ltd.) and p-dimethylamino ethyl benzoate. However, 2-hydroxy-2-methyl-1-phenylpropane-1-one, which is liquid, is particularly preferable from the viewpoint of compatibility with a liquid crystal and a resin material, e.g., a polymer forming monomer or oligomer.

It is preferable to use a liquid crystal and a resin material in such proportions that the liquid crystal content in the information recording layer is 10% to 90% by weight, more preferably 40% to 80% by weight. If the liquid crystal content is less than 10% by weight, the contrast ratio is low even when the molecules in the liquid crystal phase are aligned by information recording, whereas, if the liquid crystal content exceeds 90% by weight, unfavorable phenomena such as oozing of the liquid crystal occur, causing unevenness of the recorded image. In general, by allowing the information recording layer to contain a large amount of liquid crystal, the contrast ratio can be improved, and the operating voltage can be lowered. In doing so, however, the dispersion of the liquid crystal phase may become uneven, causing unevenness of transmittance, which generates noise in information recording.

Further, in the present invention, a fluorocarbon surface-active agent may be added for the purpose of maintaining the wetting properties with respect to the electrode layer and forming a skin layer made only of a resin material on the surface of the information recording layer.

Examples of fluorocarbon surface-active agents usable for this purpose include Fluorad FC-430 and FC-431 (manufactured by Sumitomo 3M (K.K.)), N-(n-propyl)-N-(β-acryloxyethyl)-perfluorooctyl sulfonamide (EF-125M, manufactured by Mitsubishi Material Co., Ltd.), N-(n-propyl)-N-(β-methacryloxyethyl)-perfluorooctyl sulfonamide (EF-135M, manufactured by Mitsubishi Material Co., Ltd.), perfluorooctanesulfonic acid (EF-101, manufactured by Mitsubishi Material Co., Ltd.), perfluorocaprylic acid (EF-201, manufactured by Mitsubishi Material Co., Ltd.), and N(n-propyl)-N-perfluorooctane sulfonamide ethanol (EF-121, manufactured by Mitsubishi Material Co., Ltd.), and further include EF-102, EF-103, EF-104, EF-105, EF-112, EF-121, EF122A, EF-122B, EF-122C, EF-122A3, EF-123A, EF-123B, EF-132, EF-301, EF-303, EF-305, EF-306A, EF-501, EF-700, EF-201, EF204, EF-351, EF-352, EF-801, EF-802, EF-125DS, EF-1200, EFL102, EF-L155, EF-L174 and EF-L215, which are manufactured by Mitsubishi Material Co., Ltd.). It is also possible to use 3-(2-perfluorohexyl)ethoxy-1,2-dihydroxypropane (MF-100, manufactured by Mitsubishi Material Co., Ltd.), N-n-propyl-N-2,3-dihydroxypropylperfluorooctyl sulfonamide (MF-110, manufactured by Mitsubishi Material Co., Ltd.), 3-(2-perfluorohexyl)ethoxy-1,2-epoxypropane (MF-120, manufactured by Mitsubishi Material Co., Ltd.), N-n-propyl-N-2,3-epoxypropylperfluorooctyl sulfonamide (MF-130, manufactured by Mitsubishi Material Co., Ltd.), perfluorohexyl ethylene (MF-140, manufactured by Mitsubishi Material Co., Ltd.), N-[3-trimethoxysilyl)propyl] perfluoroheptyl carboxylic acid amide (MF-150, manufactured by Mitsubishi Material Co., Ltd.), N-[3-trimethoxysilyl)propyl] perfluoroheptyl sulfonamide (MF-160, manufactured by Mitsubishi Material Co., Ltd.), etc. The fluorocarbon surface-active agent is used in the proportion of 0.1% to 20% by weight to the total amount of liquid crystal and resin material used. If necessary, a leveling agent may be added to the mixed solution to improve the coatability of the solution and to thereby obtain excellent surface properties.

Next, the steps of a method for forming the information recording layer will be explained in order:

(1) A liquid crystal, a resin material, a photo-polymerization initiator, a fluorocarbon surface-active agent are mixed with a solvent whose relative evaporation rate for n-butyl acetate is smaller than 2, thereby preparing a mixed solution having a solid content of 10% to 60% by weight. The solvent dilution is carried out so that the viscosity of the resulting solution is in the range of 1 to 500 cps (20° C.), preferably 10 to 200 cps (20° C.). If the viscosity is excessively low, the coating solution undesirably flows, making it impossible to maintain the required film thickness after the coating process. If the viscosity is excessively high, it is difficult to effect leveling. In addition, the constituent materials are dissolved on heating at a temperature not lower than the temperature at which the liquid crystal maintains the isotropic phase, preferably in the range of ±10° C. of the isotropic phase transition temperature. During the preparation of the solution, a gel formed from the ultraviolet curing resin material and foreign matter, which are present in the solution, are removed by filtration. A gel or foreign matter left in the solution causes noise when information is recorded on the resulting information recording medium.

It should be noted that if the solvent is evaporated to dryness when the mixed solution is heated at a temperature not lower than the isotropic phase temperature in the stage of preparation thereof, phase separation occurs in the mixed solution. Thus, the information recording layer of the present invention cannot be formed with the mixed solution that is in the above-described state. Therefore, it is preferable to use a solvent whose relative evaporation rate for n-butyl acetate is smaller than 2. If the relative evaporation rate is larger than 2, evaporation takes place at an excessively high rate, causing the above-described problem. In general, it is possible to use even a solvent whose R is in the range of 0.3 to 1 as long as it can be dissolved on heating at a temperature not higher than 70° C. For example, xylene (R=0.7) is preferably used. In a case where heating at 70° C. or higher is needed for dissolution, a solvent whose R is less than 0.3, e.g., cyclohexane (R=0.2), may be used.

(2) Next, the mixed solution is coated to a uniform film thickness on the electrode layer under room temperature conditions by a coating method using a spin coater, a bar coater, a blade coater, or a roll coater.

(3) The solvent is removed by evaporation with the coating layer maintained at a temperature higher than the temperature at which the liquid crystal maintains the isotropic phase, preferably in the range of ±10° C. of the isotropic phase transition temperature. If the temperature of the coating layer is lower than the isotropic phase transition temperature by 10° C. or more, large phase separation occurs between the liquid crystal and the ultraviolet curing resin material, thus giving rise to problems. That is, the liquid crystal domain grows excessively, preventing a skin layer from being formed completely over the surface of the information recording layer, so that the liquid crystal will ooze out. In addition, the ultraviolet curing resin material is matted, so that it becomes difficult to take in information accurately. Further, there are cases where the ultraviolet curing resin material cannot even retain the liquid crystal and hence no information recording layer is formed. If the temperature of the coating layer is higher than the isotropic phase transition temperature by 10° C. or more, the phase separation between the liquid crystal phase and the resin phase in the information recording layer becomes unclear, although the reason for this is not clear.

(4) With a view to removing the solvent completely, the drying treatment is preferably carried out in two steps, that is, hood drying and vacuum drying. By doing so, it is possible to prevent the surface of the information recording layer from becoming uneven, which would otherwise be caused by the flow of air, and hence possible to prevent occurrence of interference fringes.

(5) Next, the coating layer, which has been dried, is cured by irradiation with ultraviolet rays by using an UV lamp. In this process, infrared radiation is shielded, and ultraviolet radiation in which a radiation component in the range of 200 nm to 400 nm in wavelength is 1% or more is applied to the coating layer at an energy of not lower than 0.1 mJ/cm$^2$. By doing so, it is possible to obtain an information recording layer which is excellent in the phase separation between the liquid crystal phase and the resin phase.

By the above-described information recording layer forming process, a skin layer having a thickness which accounts for 0.01% to 30% of the thickness of the information recording layer can be formed on the surface of the information recording layer, and the inside of the information recording layer has a structure in which the liquid crystal phase, which forms a continuous layer, is filled with resin particles having a primary particle diameter of 0.03 μm to 0.6 μm. If a multifunctional ultraviolet curing resin material whose parameter, which is expressed by the average molecular weight divided by the average functional group, is not larger than 160 is used as an ultraviolet curing resin material, it is possible to form an information recording layer whose surface skin layer has superior durability.

By virtue of the presence of the durable skin layer formed on the information recording layer surface, it is possible to increase the proportion of liquid crystal used in the information recording layer, and there is no oozing of the liquid crystal to the surface of the information recording layer. Thus, it is possible to prevent a recorded image from being disordered by oozing of the liquid crystal, which would otherwise occur. Thus, an image of high quality can be obtained.

It should be noted that if the phase separation between the liquid crystal phase and the resin phase are incomplete in the fine structure inside the information recording layer, the desired contrast cannot be obtained. In addition, if the phase separation is incomplete, the resistance of the information recording layer itself lowers undesirably. Accordingly, when information recording is effected by the action of an electric field based on electrostatic information using a photoelectric sensor, the required voltage cannot effectively be applied to the liquid crystal phase in the information recording layer. Consequently, the drive of the liquid crystal becomes slow, causing a reduction in the sensitivity. Furthermore, if the phase separation is incomplete, when the ultraviolet curing resin material is irradiated by a UV lamp that emits radiation containing infrared rays, nonuniform shrinkage is caused by unnecessary heating which gives rise to a serious problem that the resulting information recording layer is neither uniform nor homogeneous, which is fatal to an information recording medium.

(6) The information recording layer thus formed has an average layer thickness in the range of 1 μm to 30 μm. If the layer thickness is excessively large, the operating voltage rises. In general, when it is desired to raise the sensitivity, the layer thickness should be reduced, whereas, when the contrast is desired to become higher, the layer thickness should be increased. For the information recording layer to be superior in both sensitivity and contrast ratio, the layer thickness should preferably be in the range of 3 μm to 20 μm, more preferably 5 μm to 10 μm. With such a layer thickness, it is also possible to lower the operating voltage while maintaining the high contrast.

The thickness of the skin layer provided on the information recording layer may be in the range of 0.01% to 50% of the thickness of the information recording layer. If the skin layer is excessively thin, the liquid crystal oozes out, causing noise when information is recorded on the surface thereof by using a photoelectric sensor (described later). Therefore, the thickness of the skin layer is preferably set in the range of 0.01% to 30% of the thickness of the information recording layer. The thickness of the skin layer can be properly adjusted according to the kind of ultraviolet curing resin material used, the irradiation dose of ultraviolet rays, the amount of fluorocarbon surface-active agent added, and so forth, although the reason for this is not clear.

In the first information recording medium of the present invention, the information recording layer needs to be formed by coating so as to have an accurate and uniform thickness. In this regard, the above-described method enables formation of an information recording layer having an accurate and uniform thickness. That is, as to the uniformity of layer thickness, when the thickness is in the range of 5 μm to 10 μm, the surface roughness Ra of the information recording layer can be held within 200 Å, and there is no contrast unevenness. In addition, no shading phenomenon occurs during information recording.

In this type of polymer dispersed liquid crystal, it is generally considered that the definition thereof depends more on the domain size of the liquid crystal than on the layer thickness. However, in an information recording layer in which the liquid crystal content is relatively high and the resin material forms a resin phase in the form of particles as in the case of the information recording layer of the present invention, it is unnecessary to give much consideration to the domain size of the liquid crystal as in the case of the conventional polymer dispersed liquid crystal having a relatively low liquid crystal content. Therefore, it is possible to readily provide an information recording medium of high sensitivity and high contrast ratio.

The electrode 13 may be either transparent or opaque. Any material which stably gives a resistivity of not higher than $10^6$ ohm-cm can be used for the electrode 13. Examples of such material are a thin metallic conductive film, an inorganic metallic oxide conductive film, e.g., indium-tin oxide (ITO), and an organic conductive film, e.g., quaternary ammonium salt, and so forth. The electrode 13 is formed by vapor deposition, sputtering CVD, coating, plating, dipping, electrolytic polymerization, etc. The thickness of the electrode layer 13 needs to be changed depending upon the electrical characteristics of the material thereof and the level of voltage applied to record information. For example, the thickness is about from 100 Å to 3,000 Å in the case of an ITO film. The electrode 13 may be formed either on the whole area between the substrate and the information recording layer or in conformity with a pattern in which the information recording layer is formed.

The substrate 15 may be either transparent or opaque. The substrate 15 supports the information recording medium having the shape of card, film, tape, disk or the like so as to provide the required strength. Accordingly, the substrate 15 need not be provided if the information recording layer itself has supporting properties, and there are no specific restrictions on the thickness and material of the substrate 15, provided that it is sufficiently strong to support the information recording layer. Examples of usable materials are a flexible plastic film, or a rigid material such as glass, plastic sheet, card, etc. More specifically, when the information recording medium has the shape of a flexible film, tape, disk or card, a flexible plastic film is used. When a certain strength is required, a rigid inorganic material, e.g., sheet or glass, is used.

It should be noted that when the recorded information is reproduced by transmitted light, the electrode layer 13 and substrate 15 must be transparent. In such a case, anti-reflection properties may be imparted to the substrate by stacking a layer having anti-reflection effect on the surface of the substrate 15 which is remote from the electrode layer 13, or by adjusting the thickness of the transparent substrate to a level at which anti-reflection effect is obtainable, or by combining together these two measures, according to need.

Next, a method of recording information on the first information recording medium of the present invention will be explained.

Recording of information on the information recording medium of the present invention may be effected by using a photoelectric sensor, heat, laser, corona charging, or other similar recording method. However, it is preferable to effect information recording by using a photoelectric sensor.

Figure 2:
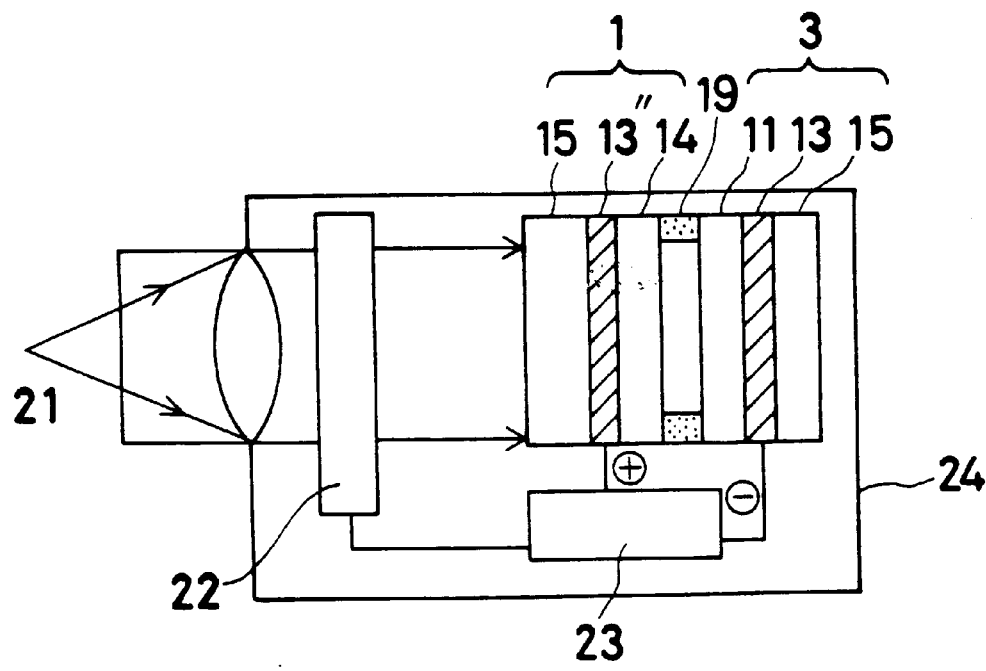
FIG. 2 schematically shows an information recording system using either the first or fifth information recording medium of the present invention.

As shown in FIG. 2, a photoelectric sensor 1 usable for the information recording has an electrode layer 13" and a photoconductive layer 14, which are stacked on a transparent substrate 15 in the mentioned order. The electrode layer 13" is formed of the same material and by the same method as in the case of the electrode layer 13 described above in connection with the first information recording medium. When the electrode layer 13" is formed by sputtering, it is possible to control the injection of electric charge into the photoconductive layer 14 from the electrode layer 13" by heating the electrode layer 13" after it has been formed, and thereby changing the crystalline structure.

The photoconductive layer 14 may have a single-layer structure which has both a function of generating electric charge according to information light applied and a charge transport function, or a double-layered structure including a charge generation layer and a charge transport layer, which are stacked in the mentioned order on the electrode layer. The photoconductive layer generally functions such that when it is irradiated with light, photocarriers (electrons or holes) are generated in the irradiated portion and these carriers are movable across the width of the layer. The photoconductive layer exhibits the effect particularly remarkably in the presence of an electric field. Such a photoelectric sensor is described, for example, in Japanese Patent Application No. 04-287983 (1992). The photoelectric sensor described in this publication has such a function that an electric field or electric charge, which is given to an information recording medium when the photoelectric sensor is irradiated with light, is amplified with time during the light irradiation. In addition, even after the termination of the light irradiation, when the voltage is continuously applied, the photoelectric sensor sustains the electrical conductivity and continuously gives the electric field or the electric charge to the information recording medium.

FIG. 2 shows an information recording system that incorporates a photoelectric sensor. In the figure, reference numeral 1 denotes a photoelectric sensor, 3 an information recording medium, 13" an electrode of the photoelectric sensor, 14 a photoconductive layer, 11 an information recording layer, 13 an electrode of the information recording medium, 15 a substrate, 19 a spacer, 21 a light source, 22 a shutter having a driving mechanism, 23 a pulse generator (power source), and 24 a camera obscura.

In information recording, when information light is incident on the information recording system from the light source 21 with a voltage applied between the electrodes 13 and 13' from the power source (pulse generator) 23, photocarriers are generated in the photoconductive layer 14 at the region where the light is incident, and the photocarriers move as far as the interface of the photoconductive layer 14 on the side thereof which is closer to the information recording layer 11 by the action of an electric field formed by the two electrodes 13 and 13', causing redistribution of the voltage. As a result, the molecules in the liquid crystal phase in the information recording layer 11 are aligned in the pattern of information light, thereby recording the desired information. Although in the illustrated system the electrode 13" of the photoelectric sensor 1 is used as a positive electrode, while the electrode 13 of the information recording medium 3 is used as a negative electrode, the polarities may be set according to the electric discharge characteristics of the photoelectric sensor used, as a matter of course.

Since some liquid crystal materials operate at a relatively low voltage, when the level of applied voltage is to be set, it is preferable to properly set the voltage distribution among the photoelectric sensor, the air gap and the information recording medium so that the voltage distributed to the information recording layer will fall in the operating voltage range of the liquid crystal used. Information recording that is effected by a photoelectric sensor enables planar analog recording and makes it possible to align the molecules in the liquid crystal phase at the electrostatic charge level. Therefore, it is possible to obtain high resolution as in the silver halide photography, and it is also possible to retain the exposure light pattern in the form of a visible image by the molecular alignment in the liquid crystal phase.

To record information on the first information recording medium of the present invention, a method that uses a camera or a recording method that uses laser may be employed. The recording method by a camera uses the information recording medium as a recording member in place of a photographic film used in an ordinary camera. Either an optical or electrical shutter can be used for this camera. It is also possible to conduct color photography by using a color filter and prisms by which light information is separated into R, G and B light components and taken out in the form of parallel rays, and forming one frame from three information recording mediums for R, G and B light components or from one set of R, G and B images recorded on one plane.

In the recording method by laser, argon laser (514 nm, 488 nm), helium-neon laser (633 nm) or semiconductor laser (780 nm, 810 nm, etc.) may be used as a light source. Laser exposure corresponding to an image signal, character signal, code signal or line drawing signal is performed by scanning. Analog recording such as recording of an image is effected by modulating the intensity of laser light, whereas digital recording such as recording of characters, code or line drawing is effected by on/off control of laser light. An image that consists of halftone dots is formed by on/off controlling laser light through a dot generator.

Figure 1B:
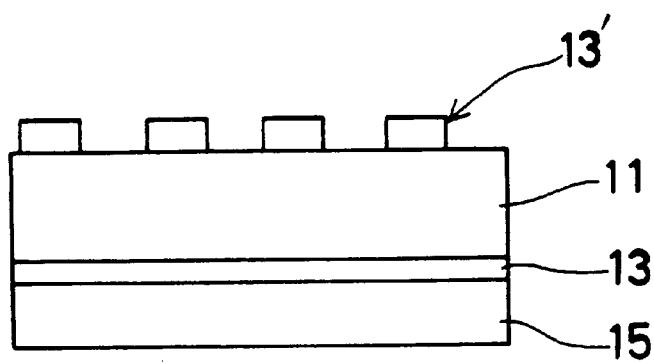

Next, the second information recording medium of the present invention will be explained. FIG. 1(b) is a sectional view of the second information recording medium according to the present invention. In the figure, reference numeral 13' denotes a patterned electrode layer, and the same reference numerals as those in FIG. 1(a) denote the same contents.

The second information recording medium is formed by additionally providing a patterned electrode layer 13' on the surface of the information recording layer of the first information recording medium. The electrode layer 13' can be formed by using a material selected from among those mentioned for the above-described electrode layer 13. It is preferable to provide an indium-tin oxide (ITO) layer, for example, in the desired pattern by sputtering or vapor deposition. It is preferable that at least one of the electrode layers 13 and 13' should be transparent.

If the information recording layer is formed by using an ultraviolet curing resin material whose parameter, which is expressed by the average molecular weight divided by the average functional group, exceeds 160, even when the resin material is cured and a skin film is thus formed on the surface of the information recording layer, the liquid crystal is likely to ooze to the surface of the layer. Accordingly, even if ITO, for example, is stacked on the surface of the information recording layer by sputtering or vapor deposition, the ITO film will be cracked, resulting in a lowering of the electrical conductivity. However, by using a multifunctional ultraviolet curing resin material whose parameter, which is expressed by the average molecular weight divided by the average functional group, is not larger than 160, it is possible to form an information recording layer whose surface has sputtering resistance. Accordingly, even if ITO, for example, is provided directly on the surface of the information recording layer by vacuum deposition or sputtering, the electrode layer will not be cracked, and there is no likelihood that the electrical conductivity will lower.

Recording of information on the second information recording medium is effected by aligning the molecules in the liquid crystal layer in accordance with the patterned electrode layer 13' by applying a voltage between the electrode layers 13 and 13', thereby enabling recording in accordance with the desired pattern.

The arrangement may be such that the electrode layers 13 and 13' are formed in a matrix to record information in a pattern by controlling the voltage applied between the electrode layers 13 and 13' so that the desired pattern is formed.

The arrangement may also be such that electrodes 13 and 13' are entirely provided on both sides of the information recording layer, and with a low voltage applied between the electrodes 13 and 13', the information recording layer is heated in a pattern by using laser light or the like so that the operating voltage at the heated regions is lowered to a level substantially equal to the applied voltage, thereby recording the pattern of the laser light.

Electrostatic information recorded on either the first or second information recording medium is reproduced as follows: When the information is reproduced by transmitted light, as shown in FIG. 3, in the information recording region, light A is transmitted because the liquid crystal molecules are aligned in the direction of the electric field, whereas, in the region where no information has been recorded, light B is scattered, thus providing a contrast with the information recording region. Information that is recorded by the liquid crystal alignment is visible information which can be read by visual observation using transmitted light, and it can also be read in the form of an enlarged image by using a projector. When laser scanning or CCD is used to read the recorded information by transmitted light, the information can be read with high accuracy. It should be noted that occurrence of scattered light can be prevented by using a Schlieren optical system, if necessary. It is also possible to read the recorded information by reflected light. When the contrast is a matter of great concern, a reflecting layer should be provided on any of the layers.

In addition, the first and second information recording mediums are cut into an appropriate size in the width direction of the layers according to each particular use application. Accordingly, the interior of the information recording layer is exposed at each cut surface, so that the liquid crystal phase may ooze out during storage. If the oozing phenomenon occurs, accurate information recording cannot be effected at the end portions of the information recording medium. To prevent the occurrence of this problem, it is preferable to stack a resin layer similar to the above on each cut surface by coating or laminating after the information recording medium has been cut into an appropriate configuration, thereby protecting the cut surfaces.

The first and second information recording mediums are designed to record electrostatic information in a visible form by the liquid crystal alignment. By properly selecting a combination of a liquid crystal and a resin material, these information recording mediums are endowed with memory effect that makes it possible to retain information that has once been recorded in a visible form by the liquid crystal alignment. The recorded information can be erased by heating the medium to a high temperature near the isotropic phase transition temperature. Thus, the medium can be reused for information recording.

The first and second information recording mediums and the information recording and reproducing method employing these mediums will be explained below more specifically by way of Examples 1 to 4 and Comparative Example 1. In these Examples, the term "parts" means parts by weight.

EXAMPLE 1

The following constituent materials were uniformly dissolved in 105 parts of xylene to prepare a coating solution:

| | |
|---|---|
| Dipentaerythritol hexaacrylate | 40 parts |
| (DPHA, M-400, manufactured by Toa Gosei Chemical Industry Co., Ltd., molecular weight/functional group = 117) | |
| Photo-curing initiator | 2 parts |
| (2-hydroxy-2-methyl-1-phenylpropane-1-one, Darocure 1173, manufactured by Ciba-Geigy Ltd.) | |
| Smectic liquid crystal | 60 parts |
| (S-6, manufactured by BDH) | |
| Fluorocarbon surface-active agent | 3 parts |
| (Fluorad FC-430, manufactured by Sumitomo 3M) | |

The resulting solution was coated by using a blade coater on the ITO film side of a glass substrate (1.1 mm in thickness) having an ITO film formed thereon to a thickness of about 2,000 Å by sputtering. The wet coating was dried for 3 minutes at 50° C. and then vacuum-dried for 2 minutes at 50° C. Immediately thereafter, the dry film was irradiated with ultraviolet rays at 500 mJ/cm$^2$ to cure the resin material, thereby preparing a first information recording medium of the present invention. The thickness of the information recording layer was 6 μm.

A cross-section of the information recording layer was dried after the liquid crystal was extracted with hot methanol, and then the internal structure of the information recording layer was observed with a scanning electron microscope (S-800, manufactured by Hitachi, Ltd.; magnification of 10,000). As a result, it was revealed that the surface of the information recording layer was covered with the ultraviolet curing resin material having a thickness of 0.6 μm and the inside of the layer had a structure in which the liquid crystal phase that formed a continuous layer was filled with the resin particle phase having a particle diameter of 0.1 μm.

When an ITO film was formed in a pattern on the cured information recording layer by sputtering to form an upper electrode, it was possible to form the ITO film with a thickness of about 1,000 Å. Thus, a second information recording medium according to the present invention was prepared.

Lead wires were attached to the two electrodes of the second information recording medium, and a DC voltage of 400 V was applied between the terminals of the electrodes for 0.1 sec. Before the application of the voltage, the transmittance of light of 633 nm was 40%, whereas after the voltage application, the transmittance was 80%. The transparent state was held for more than 1 year at room temperature. Thus, the information recording medium exhibited excellent memory properties. Next, the information recording medium which had already been subjected to the voltage application was placed on a hot plate at 60° C. for 10 sec., and immediately thereafter, the medium was cooled down to room temperature. In consequence, the whole medium returned to the scattering state before the voltage application without oozing of the liquid crystal, so that it became capable of being reused.

EXAMPLE 2

First and second information recording mediums of the present invention were prepared in the same way as in Example 1 except that the dipentaerythritol hexaacrylate in Example 1 was replaced by the same amount of an acrylate, TPA-330, trade name (molecular weight/functional group= 157; manufactured by Nippon Kayaku Co., Ltd.). When the information recording mediums were tested in the same way as in Example 1, the same results as those in Example 1 were obtained.

EXAMPLE 3

First and second information recording mediums of the present invention were prepared in the same way as in Example 1 except that the dipentaerythritol hexaacrylate in Example 1 was replaced by the same amount of trimethylolpropane triacrylate (TMPTA; molecular weight/ functional group=99; manufactured by Nippon Kayaku Co., Ltd.). When the information recording mediums were tested in the same way as in Example 1, the same results as those in Example 1 were obtained.

EXAMPLE 4

On a glass substrate having a thickness of 1.1 mm and thoroughly cleaned, an ITO film having a thickness of 1,000 Å was deposited by EB evaporation to obtain an electrode layer.

The surface of the electrode was coated with a coating solution in 0.4 sec. by a spinner at 1400 rpm. The coating solution was prepared by mixing together 3 parts by weight of a fluorenone-azo pigment having the following structure as a charge generating substance, 1 part by weight of a polyester resin material (Vylon 200, manufactured by Toyobo Co., Ltd.), 98 parts by weight of 1,4-dioxane, and 98 parts by weight of cyclohexanone and shaking the mixture for 6 hours in a paint shaker.

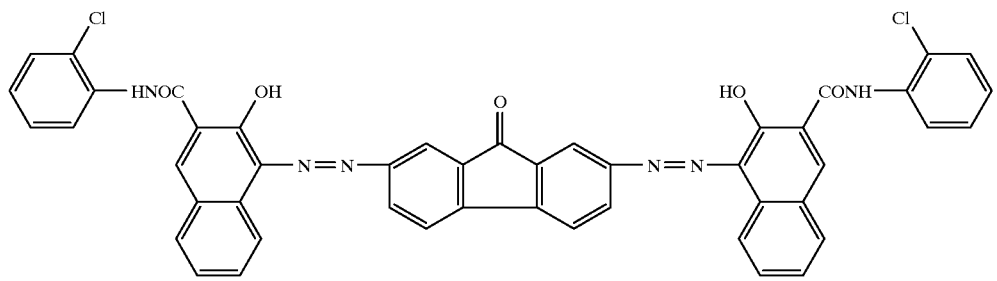

Thereafter, drying was carried out for 1 hour at 100° C. Thus, a charge generation layer having a thickness of 3,000 Å was stacked on the electrode.

The surface of the charge generation layer was coated with a coating solution in 0.3 msec. by a spinner at 300 rpm. The coating solution was prepared by mixing together 25 parts by weight of a para-dimethyl stilbene having the following structure as a charge transport substance, 5 parts by weight of a polystyrene resin material (HRM-3, manufactured by Denki Kagaku Kogyo K.K.), 102 parts by weight of 1,1,2-trichloroethane, and 68 parts by weight of dichloromethane.

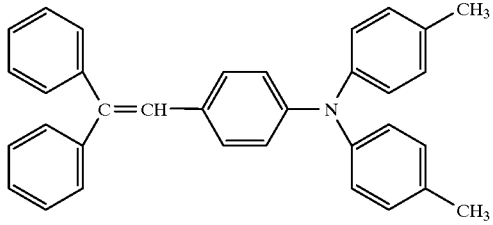

Thereafter, drying was carried out for 2 hours at 80° C., thereby stacking a charge transport layer on the charge generation layer, and thus obtaining a photoelectric sensor having a photoconductive layer of 20 μm in thickness.

The photoelectric sensor and the first information recording medium prepared in Example 1 were disposed to face each other across an air gap of 10 μm defined by a spacer 19 of polyimide film, thereby forming an information recording system as shown in FIG. 2.

A DC voltage of 850 V was applied between the respective electrodes of the photoelectric sensor and the information recording medium for 0.05 sec., and at the same time, exposure was carried out by projecting a gray scale from the photoelectric sensor side for 1/30 sec. with an imaging camera (RB67, manufactured by Mamiya Camera Co., Ltd.). After the exposure, the information recording medium was taken out. When the information recording medium was observed by transmitted light, the transmittance in the light-transmitting portions was 80%, and record regions comprising the light-transmitting portions corresponding to the gray scale were observed.

Next, the information recorded on the information recording medium was read with a film scanner (LS-3500, manufactured by Nikon Corporation), and the read information was output by using a sublimation transfer printer (SP-5500, manufactured by JVC). As a result, a favorable print corresponding to the gray scale was obtained.

COMPARATIVE EXAMPLE 11

A first information recording medium was prepared in the same way as in Example 1 except that the resin material in Example 1 was replaced by the same amount of a trifunctional acrylate (molecular weight/functional group=179, manufactured by Toa Gosei Chemical Industry Co., Ltd.).

When an ITO film was formed to a thickness of 1,000 Å on the obtained information recording layer by sputtering, the ITO film was cracked and could not be used as an electrode layer. When information recording was carried out by using this information recording medium in the same way as in Example 3, the liquid crystal oozed out, making it difficult to effect information recording.

Next, the third and fourth information recording mediums of the present invention will be explained.

FIG. 4(a) is a sectional view schematically showing the third information recording medium of the present invention. In the figure, reference numeral 3 denotes an information recording medium, 11 an information recording layer, 12 a resin layer, 13, 13" electrode layers, 14 a photoconductive layer, and 15 a substrate. Each layer will be explained below with reference to FIG. 4(a).

The electrode layers 13 and 13" and the substrate 15 must be transparent at either or both sides thereof. The electrode layer 13 and the substrate 15 may be the same as the electrode layer 13 and the substrate 15 in the first information recording medium.

The electrode layer 13" on the side of the photoconductive layer 14 is formed of the same material and by the same method as in the case of the electrode layer 13. When the electrode layer 13" is formed by sputtering, it is possible to control the injection of electric charge into the photoconductive layer 14 from the electrode layer 13" by heating the electrode layer 13" after it has been formed, and thereby changing the crystalline structure.

It should be noted that anti-reflection properties may be imparted to the surface of the substrate 15 which is remote from the electrode layer 13 by stacking a layer having anti-reflection effect, or by adjusting the thickness of the transparent substrate to a level at which anti-reflection effect is obtainable, or by combining together these two measures, according to need.

The photoconductive layer 14 may have a single-layer structure or a double-layered structure including a charge generation layer and a charge transport layer, which are stacked in the mentioned order on the electrode layer. The photoconductive layer generally functions such that when it is irradiated with light, photocarriers (electrons or holes) are generated in the irradiated portion and these carriers are movable across the width of the layer. The photoconductive layer exhibits the effect particularly remarkably in the presence of an electric field. It is particularly preferable for the photoconductive layer to have such a function that an electric field, which is given to the information recording medium when the photoconductive layer is irradiated with light, is amplified with time during the light irradiation, and even after the termination of the light irradiation, when the voltage is continuously applied, the photoconductive layer sustains the electric conductivity and continuously gives the electric field to the information recording medium.

A single-layer photoconductive layer is formed of an inorganic or organic photoconductive substance. Examples of inorganic photoconductive substances include Se, Se—Te, ZnO, $TiO_2$, Si, CdS, etc. Such an inorganic photoconductive material is stacked on the electrode to a layer thickness of 5 μm to 30 μm, preferably 20 μm to 30 μm, by vapor deposition, sputtering, CVD, etc. It is also possible to form a photoconductive layer by dispersing an inorganic photoconductive substance in the form of finely divided particles in an organic insulating resin material, for example, a silicone resin, a polyester resin, a polycarbonate resin, a styrene-butadiene resin, a styrene resin, a polyvinyl acetal resin, etc. In this case, it is preferable to disperse 0.1 to 10 parts by weight, preferably 1 to 5 parts by weight, of finely divided photoconductive particles in 1 part by weight of a resin material.

Organic photoconductive substances include dispersions of high- and low-molecular photoconductive substances in an insulating binder. Examples of high-molecular photoconductive substances are polyvinyl carbazole (PVK), and poly-N-ethylenic unsaturated group-substituted carbazoles in which an ethylenic unsaturated group, e.g., allyl group or acryloxyalkyl group, is contained in place of the vinyl group in PVK. Examples of high-molecular photoconductive substances further include poly-N-ethylenic unsaturated group-substituted phenothiazines, e.g., poly-N-acrylphenothiazine, poly-N-(β-acryloxy)phenothiazine, etc., and polyvinyl pyrene. Among these substances, poly-N-ethylenic unsaturated group-substituted carbazoles, particularly polyvinyl carbazole may preferably be employed.

Examples of low-molecular photoconductive substances are oxadiazoles substituted by alkylaminophenyl group or the like, a triphenylmethane derivative, a hydrazone derivative, a butadiene derivative, a stilbene derivative, etc. It is also possible to form an organic photoconductive layer having film-forming properties by dispersing 1 part by weight of one selected from among the above low-molecular photoconductive substances in 0.1 to 5 parts by weight, preferably 0.1 to 1 part by weight, of an electrically insulating resin material, e.g., a silicone resin, a polyester resin, a polycarbonate resin, a styrene-butadiene copolymer resin, a styrene resin, a polyvinyl acetal resin, etc.

An organic photoconductive layer produced by any of the above-described methods is formed on the electrode so that the dry film thickness is in the range of 5 $\mu$m to 30 $\mu$m, preferably in the range of 10 $\mu$m to 30 $\mu$m.

In necessary, a persistent conductivity imparting agent as described in Japanese Patent Application No. 04-287983 (1992) may be added to the organic photoconductive layer. Although the above-described organic photoconductive layer per se has persistent conductivity, such a persistence conductivity imparting substance is added thereto for the purpose of enhancing the persistent conductivity. A persistent conductivity imparting agent is added in the ratio of 0.001 to 1 part by weight, particularly 0.001 to 0.1 part by weight, to 1 part by weight of an organic photoconductive substance. If the amount of persistent conductivity imparting agent added exceeds 1 part by weight, the amplifying function of the photoelectric sensor markedly lowers, which is unfavorable. In some persistent conductivity imparting substances, the spectral sensitivity is not in the visible light region. Therefore, in a case where light information in the visible light region is used, an electron accepting substance, a sensitizing dye, etc. may be added to the photoconductive layer in order to impart thereto sensitivity in the visible light region. Examples of electron accepting substances usable for this purpose are nitro-substituted benzene, diamino-substituted benzene, halogen-substituted benzene, quinones, and trinitrofluorenones. Examples of usable sensitizing dyes are a triphenyl methane dye, a pyrylium salt dye, and a xanthene dye. An electron accepting substance and a sensitizing dye are each added in the ratio of 0.001 to 1 part by weight, preferably 0.01 to 1 part by weight, to 1 part by weight of an organic photoconductive substance. In a case where light information is in the infrared region, a pigment, e.g., phthalocyanine, or a pyrrole or cyanine dye should be added in an amount approximately equal to the above. If the information light used is in the ultraviolet region or a shorter wavelength region, a light-absorbing substance appropriate for the wavelength region concerned should be added in the same amount as the above. Thus, the intended object can be attained.

A double-layered photoconductive layer is formed by successively stacking a charge generation layer and a charge transport layer on the electrode. This type of photoconductive layer includes an inorganic material photoconductive layer and an organic material photoconductive layer.

The charge generation layer in the inorganic material photoconductive layer is formed on the electrode to a thickness of 0.05 $\mu$m to 1 $\mu$m by vapor deposition, sputtering, CVD, etc. using a material such as Se—Te or Si doped with sulfur or oxygen, for example. Then, a charge transport layer is formed on the charge generation layer to a thickness of 10 $\mu$m to 50 $\mu$m in the same way as the above using a material such as Se, $As_2$, $Se_3$, Si, or Si doped with methane, for example.

The charge generation layer in the organic material photoconductive layer is composed of a charge generating substance and a binder. Examples of charge generating substances usable in the present invention are fluorenone azo pigments, monoazo pigments, bis-azo pigments, pyrrole pigments, azulenium salt pigments, phthalocyanine pigments, polycyclic aromatic pigments, pyrylium salt dyes, triazo pigments, squalium salt dyes, perylene pigments, anthanthrone pigments, cyanine pigments, polycyclic quinone pigments, and imidazole pigments. Specific examples of charge generating substances usable in the present invention are those which are described in Japanese Patent Application NO. 04-287983 (1992).

Examples of binders usable in the present invention are a silicone resin, a styrene-butadiene copolymer resin, an epoxy resin, an acrylic resin, a saturated or unsaturated polyester resin, a PMMA resin, a vinyl chloride resin, a vinyl acetate resin, a vinyl chloride-vinyl acetate resin, etc. A charge generating substance selected from among those mentioned above is dispersed in one of these binders to form an organic material charge generation layer. Preferable examples of charge generating substances are a fluorenone-azo pigment and a bis-azo pigment. Preferable examples of binders are a polyester resin and a vinyl chloride-vinyl acetate resin. It is preferable to mix 0.1 to 10 parts by weight, preferably 0.1 to 1 part by weight, of a binder with 1 part of a charge generating substance. The dry film thickness of the charge generation layer is in the range of 0.01 $\mu$m to 1 $\mu$m, preferably in the range of 0.1 $\mu$m to 0.3 $\mu$m.

The charge transport layer is composed of a charge transport substance and a binder. The charge transport substance is a substance having excellent properties to transport electric charge generated in the charge generation layer. Examples of charge transport substances usable in the present invention are hydrazone, pyrazoline, PVK carbazole, oxazole, triazole, aromatic amine, amine, triphenylmethane, butadiene, stilbene, and polycyclic aromatic compounds. The charge transport substance must have excellent hole transport properties. Preferable charge transport substances are butadiene and stilbene compounds. Specific examples of charge transport substances are those which are described in Japanese Patent Application No. 04-287983 (1992).

It is possible to use binders similar to those described above for the charge generation layer. Preferable binders are a polyvinyl acetal resin, a styrene resin, a styrene-butadiene copolymer resin. It is preferable to mix 0.1 to 10 parts by weight, more preferably 0.1 to 1 part by weight, of a binder with 1 part of a charge transport substance. The dry film thickness of the charge transport layer is in the range of 1 $\mu$m to 50 $\mu$m, preferably in the range of 10 $\mu$m to 30 $\mu$m.

Regarding the combination of charge generating and transport substances, it is preferable to combine together a fluorenone-azo pigment (charge generating substance) and a stilbene charge transport substance, and a combination of a bis-azo pigment (charge generating substance) and a butadiene or hydrazone charge transport substance.

Further, a persistent conductivity imparting agent and an electron accepting substance as those described for the single-layer photoconductive layer may be added to the charge generation and transport layers in the double-layered photoconductive layer in the same ratios as the above. However, it is preferable to add them to the charge generation layer.

When an organic photoconductive layer is used to constitute the above-described single-layer or double-layered photoconductive layer, it is preferable to use a coating solution prepared using as a solvent dichloroethane, 1,1,2-trichloroethane, monochlorobenzene, tetrahydrofuran, cyclohexane, dioxane, 1,2,3-trichloropropane, ethyl cellosolve, 1,1,1-trichloroethane, methyl ethyl ketone, chloroform, toluene, etc. The coating solution may be coated by blade coating, dipping, or spinner coating, for example.

The photoconductive layer may be provided on the electrode through a charge injection control layer. The charge injection control layer is provided according to need to adjust the voltage practically applied to the information recording medium by controlling the injection of electric charge into the photoconductive layer from the electrode 13. In the information recording medium of the present invention, the sensitivity of the photoconductive layer must be set in the operating voltage range of the liquid crystal in the information recording layer. The reason for this is that the difference (contrast potential) between the potential (light potential) applied to the information recording layer in the exposed region and the potential (dark potential) applied to the information recording layer in the unexposed region must be large in the operating range of the liquid crystal.

Accordingly, the dark potential applied to the liquid crystal layer in the unexposed region of the photoconductive layer, for example, needs to be set at the level of the operation initiating potential of the liquid crystal. Therefore, the photoconductive layer is demanded to have an electrical conductivity whereby a dark current of $10^{-4}$ to $10^{-8}$ A/cm$^2$, preferably $10^{-5}$ to $10^{-6}$ A/cm$^2$, is induced when an electric field of $10^5$ V/cm to $10^6$ V/cm is applied to the bulk layer of the photoconductive layer. In a photoconductive layer in which the dark current induced is less than $10^{-8}$ A/cm$^2$, the molecules in the liquid crystal layer are not aligned even under exposure conditions. In a photoconductive layer in which a dark current of $10^{-4}$ A/cm$^2$ or more is induced, a large current flows at the same time as the voltage application is initiated even in a state where no exposure light is applied, causing the liquid crystal molecules in the information recording layer to be undesirably aligned. Consequently, no transmittance difference between the exposed and unexposed regions can be obtained even when exposure is carried out. The charge injection control layer is appropriately provided with relation to the above-described characteristics of the information recording medium. When the dark potential in the photoconductive layer needs to be held down to a low level, the charge injection control layer is formed as a charge injection preventing layer. There are two types of charge injection preventing layer, that is, a layer that utilizes the tunnel effect, and a layer that utilizes rectifying effect. It is possible to use a charge injection preventing layer as described in Japanese Patent Application No. 04-287983 (1992).

The information recording layer 11 that is provided on the photoconductive layer 14 comprises a liquid crystal phase and a resin phase. It is possible to use the same liquid crystal materials as those described in connection with the first information recording medium.

As a material for forming the resin phase, it is possible to use thermosetting resin materials which are compatible with a solvent common to the liquid crystal material, for example, an acrylic resin, methacrylic resin, polyester resin, polystyrene resin, copolymers composed mainly of these resin materials, epoxy resin, silicone resin, etc. Particularly preferable examples are ultraviolet curing resin materials which are compatible with a liquid crystal material or a common solvent therewith in the form of a monomer or an oligomer.

Examples of such ultraviolet curing resin materials are acrylic and methacrylic esters, i.e., multifunctional monomers and multifunctional urethane and ester oligomers, e.g., dipentaerythritol hexaacrylate, trimethylolpropane triacrylate, polyethylene glycol diacrylate, polypropylene glycol diacrylate, isocyanuric acid (ethylene oxide modified) triacrylate, dipentaerythritol pentaacrylate, dipentaerythritol tetraacrylate, neopentyl glycol diacrylate, hexanediol diacrylate, etc., and monofunctional monomers or oligomers, e.g, nonyl phenol modified acrylate, N-vinyl-2-pyrrolidone, 2-hydroxy-3-phenoxypropyl acrylate, etc.

As to the solvent, any common solvent can be used, for example, hydrocarbon solvents represented by xylene, halogenated hydrocarbon solvents represented by chloroform, alcohol derivative solvents represented by methyl cellosolve, and ether solvents represented by dioxane.

Examples of photo-curing agents usable in the present invention are the same as those described above in connection with the first information recording medium.

It is preferable to use a liquid crystal and a resin material in such a ratio that the liquid crystal content in the information recording layer is 10% to 90% by weight, more preferably 40% to 80% by weight. If the liquid crystal content is less than 10% by weight, light transmittance is alow even when the molecules in the liquid crystal phase are aligned by information recording, whereas, if the liquid crystal content exceeds 90% by weight, the liquid crystal oozes out, causing unevenness of the recorded image. By allowing the information recording layer to contain a relatively large amount of liquid crystal, the contrast ratio can be improved, and the operating voltage can be lowered.

In addition, by making the refractive indices of the liquid crystal and resin phases in;the information recording layer approximately equal to each other, the information recording layer can be selectively made opaque and transparent as follows: When no electric field is applied thereto, the information recording layer is opaque due to light scattering, whereas, when an electric field is applied to the information recording layer, the molecules in the liquid crystal phase are aligned, thus enabling the information recording region to become transparent. No polarizer is needed when the recorded information is reproduced, and hence the optical system required for reading can be simplified.

The information recording layer is formed by a method wherein a mixed solution of a resin material and a liquid crystal is coated on the photoconductive layer by a coating method using a blade coater, a roll coater or a spin coater, and then the resin material is cured. If necessary, a leveling agent may be added to the mixed solution to improve the coatability of the solution and to thereby obtain excellent surface properties.

Further, a fluorocarbon surface-active agent may be added to the coating solution for the purpose of maintaining the wetting properties with respect to the photoconductive layer and forming a skin layer made only of the resin material on the surface of the information recording layer. Examples of fluorocarbon surface-active agents usable for this purpose are the same as those described above in connection with the first information recording medium. The fluorocarbon surface-active agent is used in the proportion of 0.1% to 20% by weight to the total amount of liquid crystal and resin material used.

To coat the mixed solution of a resin material and a liquid crystal, it is necessary to completely dissolve the resin material and the liquid crystal in each other by heating the solution at a temperature higher than the temperature at which the liquid crystal maintains the isotropic phase. If the information recording layer is cured at a temperature lower than the temperature at which the liquid crystal shows an isotropic phase, partial phase separation occurs between the liquid crystal and the resin material, thus giving rise to problems. That is, the liquid crystal domain grows excessively, preventing a skin layer from being formed completely over the surface of the information recording layer, so that the liquid crystal will ooze out. In addition, the resin material is matted, so that it becomes difficult to take in information accurately. Further, there are cases where the resin material cannot even retain the liquid crystal and hence no information recording layer is formed. When heating is required in order to maintain the isotropic phase when the solvent is evaporated, particularly, the wetting properties with respect to the photoconductive layer lower, making it impossible to obtain a uniform information recording layer.

Particularly, when an ultraviolet curing resin is used as a resin material, a skin layer having a thickness of about 0.6 μm is formed on the surface of the resulting information recording layer. In addition, the use of an ultraviolet curing resin material makes it possible to form an information recording layer the inside of which has a structure including a liquid crystal phase which is filled with resin particles having a primary particle diameter of 0.03 μm to 0.6 μm. By virtue of the presence of the skin layer formed on the surface of the information recording layer, it is possible to increase the proportion of the liquid crystal used in the information recording layer. In addition, it is possible to suppress oozing of the liquid crystal to the surface of the information recording layer and hence possible to minimize the disorder of the image caused by the oozing of the liquid crystal.

Since the thickness of the information recording layer influences the definition of recorded information, it is preferable to set the thickness of the layer after it has been dried in the range of 0.1 μm to 20 μm, more preferably 3 μm to 8 μm. By doing so, the operating voltage can be lowered with the definition maintained at high level. If the information recording layer is excessively thin, the contrast of the information recording part becomes low, whereas, if the layer is excessively thick, the operating voltage must be raised.

Next, a resin layer 12 is stacked on the information recording layer 11. The resin layer 11 is preferably formed by coating a thermoplastic resin film, a thermosetting resin film, an ionizing radiation curing resin film, e.g., an ultraviolet curing resin film, etc. It is also possible to use an aqueous solution of polyvinyl alcohol, water-system polyurethane, water glass, etc. as a water-soluble resin material which is less compatible with an organic solvent and to coat such an aqueous solution by a blade coater, a roll coater, or a spin coater. It is also possible to use a coating solution prepared by dissolving a resin material, such as polytetrafluoroethylene, fluorinated ethylene propylene, tetrafluoroethylene perfluoroalkyl vinyl ether copolymer, polyimide resin, polyether ketone resin, or poly-para-xylylene, in a fluorine-containing solvent. Further, the resin layer 12 may also be formed by laminating a film of one of various kinds of polymer described above on the surface of the information recording layer 11 or bonding such a polymer film to the information recording layer surface through an adhesive.

Particularly preferable examples of materials for forming the resin layer 12 are polyethylene terephthalate, a multifunctional ultraviolet curing resin material, and polystyrene. With these resin materials, a hard coat layer having a high surface hardness can be obtained even when it is in the form of a thin film. Thus, the durability of the information recording medium can be improved.

The resin layer 12 has a thickness of 0.01 μm to 40 μm, preferably 0.05 μm to 5 μm. However, when the resin layer 12 is thick, the operating voltage applied to the liquid crystal phase during information recording lowers. Therefore, it is necessary to raise the applied voltage in the information recording method of the present invention (described later). By stacking the resin layer 12 on the information recording layer 11, it is possible to prevent oozing of the liquid crystal from the surface of the information recording layer 11. In addition, it is possible to maintain the electrical conductivity of the electrode layer 13 stacked on the resin layer 12 and to effect information recording free from noise or other problem.

Next, the electrode layer 13 is provided on the resin layer 12 using a material and a stacking method which are similar to those employed to form the above-described electrode layer 13". In this case, since the resin layer 12 has been formed, if an ITO film, for example, is stacked by vapor deposition, sputtering or other similar method, the ITO film will not be cracked, which would otherwise result in a lowering of the electrical conductivity. A substrate similar to the above may be stacked on the electrode layer 13.

The information recording medium thus obtained is cut into an appropriate size in the width direction of the layers according to each particular use application. Accordingly, the interior of the information recording layer is exposed at each cut surface, so that the liquid crystal phase may ooze out during storage. If the oozing phenomenon occurs, accurate information recording cannot be effected at the end portions of the information recording medium. To prevent the occurrence of this problem, it is preferable to stack a resin layer similar to the above on each cut surface by coating or laminating after the information recording medium has been cut into an appropriate configuration, thereby protecting the cut surfaces.

Next, the fourth information recording medium of the present invention will be explained.

FIG. 4(b) is a sectional view of the fourth information recording medium according to the present invention, in which reference numeral 16 denotes an insulating layer, and the same reference numerals as those in FIG. 4(a) denote the same contents.

The fourth information recording medium includes an insulating layer 16 provided between the photoconductive layer 14 and the information recording layer 11 in the third information recording medium. This information recording medium is particularly suitable for an arrangement in which the photoconductive layer is an organic photosensitive layer formed by using a solvent. Thus, the insulating layer 16 is provided to prevent occurrence of unevenness of the recorded image which might otherwise be caused by elution of the liquid crystal from the information recording layer by the interaction between the photoconductive layer and the information recording layer if the latter is coated directly on the former, or elution of the photoconductive material by a solvent used for forming the information recording layer.

Accordingly, the material for forming the insulating layer 16 needs to be incompatible with either of the materials for forming the organic photoconductive layer and the information recording layer. If the material is electrically conductive, the space charge is diffused, causing deterioration of the resolution. Therefore, insulating properties are required. However, since the insulating layer lowers the voltage distributed to the liquid crystal layer or degrades the definition, it is preferable for the layer thickness to be as small as possible, preferably 2μm or less. On the other hand, reduction in the layer thickness gives rise to not only generation of information noise due to the interaction that progresses with the passage of time but also the problem of permeation due to defects such as pinholes at the time of coating the material for stacking the layer. Since the permeability depends on the proportion of the solid content of the material to be coated for stacking, the kind of solvent used and the viscosity, the layer thickness is properly set in accordance with the material which is to be coated. When the voltage distribution to each layer is taken into consideration, it is preferable to use a material having a high dielectric constant as well as to minimize the layer thickness.

For example, the insulating layer is preferably formed by depositing an inorganic material, e.g., $ZnO_2$, $MgF_2$, $SiO_2$, $TiO_2$, $CeO_2$, $Al_2O_3$, $GeO_2$, $Si_3N_4$, AlN, TiN, etc., by vapor deposition, sputtering, chemical vapor deposition (CVD), etc. It is also possible to use an aqueous solution of polyvinyl alcohol, water-system polyurethane, polyvinyl pyrrolidine, polyacrylamide, water-soluble ultraviolet curing resin, water glass, etc. as a water-soluble resin material which is less compatible with an organic solvent and to coat such an aqueous solution by spin coating, blade coating, roll coating and so forth. Further, a coatable fluorocarbon resin may also be used. In such a case, it may be dissolved in a fluorine-containing solvent and coated by spin coating or stacked by blade coating, roll coating, etc. Coatable fluorocarbon resins which are preferable to use include fluorocarbon resins disclosed in Japanese Patent Application No. 04-24722 (1992). When a coating type insulating material is used, it is necessary to select such a material that a solvent used therefor does not dissolve the photoconductive layer and it does not dissolve in a material constituting the information recording layer when formed by coating or in a solvent used when the information recording layer constituting material is coated.

In addition, if the insulating layer is formed of an organic material which is formed into a film in a vacuum system, there is no likelihood that the material will dissolve the photoconductive layer during film formation. Examples of materials usable for film formation by vapor deposition are polyethylene, polypropylene, poly(monochlorotrifluoroethylene), polytetrafluoroethylene, etc. Materials usable for film formation by CVD include poly-para-xylylene and other materials which are described as specific examples in Japanese Patent Application No. 04-24722 (1992). It should be noted that there is no need to provide an insulating layer when the photoconductive layer is formed of an inorganic material and hence there is no interaction between the photoconductive layer and the information recording layer, such as oozing of the liquid crystal.

The third and fourth information recording mediums of the present invention are designed to record electrostatic information in a visible form by the liquid crystal alignment. By properly selecting a combination of a liquid crystal and a resin material, these information recording mediums are endowed with memory effect that makes it possible to retain information that has once been recorded in a visible form by the liquid crystal alignment. The recorded information can be erased by heating the medium to a high temperature near the isotropic phase transition temperature. Thus, the medium can be reused for information recording.

Next, the information recording and reproducing method for the third and fourth information recording mediums of the present invention will be explained.

Figure 5:
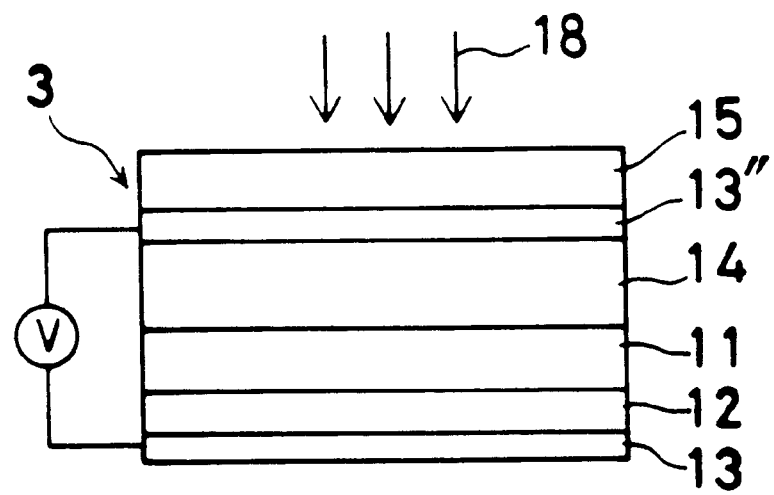
FIG. 5 is a view for explanation of a method of recording information on the third information recording medium of the present invention.

FIG. 5 is a view for explanation of the method of recording information on the third information recording medium of the present invention. It should be noted that the information recording method for the fourth information recording medium is the same as that for the third information recording medium.

When information light 18 is incident on the information recording medium with a voltage applied between the electrodes 13 and 13', photocarriers are generated in the photoconductive layer 14 at the region where the light is incident, and the photocarriers move by the action of an electric field formed by the two electrodes 13 and 13', causing redistribution of the voltage. As a result, the molecules in the liquid crystal phase in the information recording layer 11 are aligned in the pattern of information light 18, thereby recording the desired information. It should be noted that it is also possible to apply a voltage for a predetermined time with the information light 18 being made incident on the information recording medium.

In addition, since the operating voltage and its range differ among liquid crystals, when the level of applied voltage and voltage application time are to be set, it is preferable to properly set the voltage distribution in the information recording medium so that the voltage distributed to the information recording layer will fall in the operating voltage range of the liquid crystal used.

The information recording method of the present invention enables planar analog recording and makes it possible to obtain recording at the liquid crystal domain level and hence high resolution, and it also permits the exposure light pattern to be retained in the form of a visible image by the molecular alignment in the liquid crystal phase.

To input information to the third and fourth information recording mediums of the present invention, it is possible to adopt a method similar to the above-described information input method for the first information recording medium of the present invention.

Figure 6:
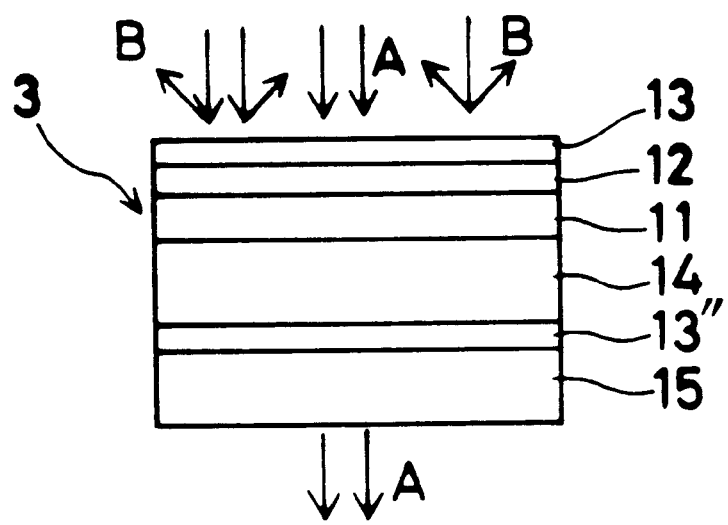
FIG. 6 is a view for explanation of a method of reproducing information recorded on the third information recording medium of the present invention.

Electrostatic information recorded on the third information recording medium may be reproduced by transmitted light, as shown in FIG. 6. In the information recording region, light A is transmitted because the liquid crystal molecules are aligned in the direction of the electric field, whereas, in the region where no information has been recorded, light B is scattered, thus providing a contrast with the information recording region. Information that is recorded by the liquid crystal alignment is visible information which can be read by visual observation using transmitted light, and it can also be read in the form of an enlarged image by using a projector. When laser scanning or CCD is used to read the recorded information by transmitted light, the information can be read with high accuracy. It should be noted that occurrence of scattered light can be prevented by using a Schlieren optical system, if necessary. The recorded information may be read by reflected light by use of a reflecting film provided appropriately.

In a case where the insulating layer 16 is a transparent insulating layer, electrostatic information recorded on the fourth information recording medium can be read by transmitted light in the same way as shown in FIG. 6. If the insulating layer is formed as a dielectric mirror layer, the recorded information can be read by reflected light.

The third and fourth information recording mediums of the present invention will be explained below more specifically by way of Example 5. In the Example, the term "parts" means parts by weight, and "%" means per cent by weight.

EXAMPLE 5

On a glass substrate having a thickness of 1.1 mm and thoroughly cleaned, an ITO film having a thickness of 1,000 Å was deposited by EB evaporation to obtain an electrode layer.

The surface of the electrode was coated with a coating solution in 0.4 sec. by a spinner at 1,400 rpm. The coating solution was prepared by mixing 3 parts by weight of a fluorenone-azo pigment (manufactured by Nihon Kanko Shikiso K.K.) having the following structure as a charge generating substance, 1 part by weight of a polyester resin material (Vylon 200, manufactured by Toyobo Co., Ltd.), 98 parts by weight of 1,4-dioxane, and 98 parts by weight of cyclohexanone and shaking the mixture for 6 hours in a paint shaker.

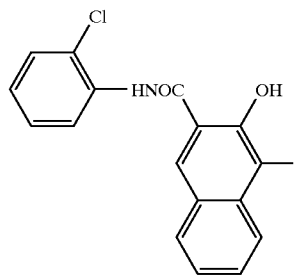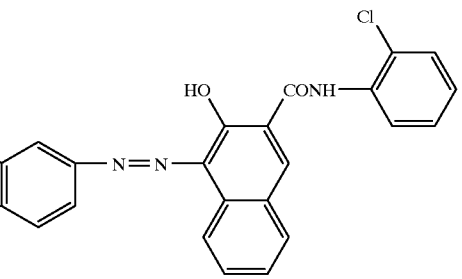

Thereafter, drying was carried out for 1 hour at 100° C. Thus, a charge generation layer having a thickness of 3,000 Å was stacked on the electrode.

The surface of the charge generation layer was coated with a coating solution in 0.3 msec. by a spinner at 300 rpm. The coating solution was prepared by mixing together 25 parts by weight of a para-dimethyl stilbene having the following structure as a charge transport substance, 5 parts by weight of a polystyrene resin material (HRM-3, manufactured by Denki Kagaku Kogyo K.K.), 102 parts by weight of 1,1,2-trichloroethane, and 68 parts by weight of dichloromethane.

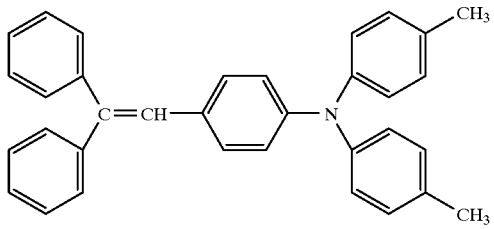

Thereafter, drying was carried out for 2 hours at 80° C., thereby stacking a charge transport layer on the charge generation layer, and thus obtaining a photoelectric sensor having a photoconductive layer of 20 μm in thickness which included charge generation and transport layers.

Next, the surface of the photoconductive layer was coated by spinner coating method (1500 rpm; 20 sec) with a solution of 4.5% a fluorocarbon resin (Cytop, manufactured by Asahi Glass Company, Ltd., having a water absorption of 0.01% and a resistivity of $1 \times 10^{18}$ ohm-cm) in perfluoro(2-butyl tetrahydrofuran), and it was dried for 3 hours at 80° C., thereby obtaining a transparent insulating layer having a thickness of about 0.8 μm.

Next, the surface of the transparent insulating layer was coated by using a blade coater with a solution prepared by uniformly dissolving the following constituent materials in 105 parts of xylene (special grade chemical, manufactured by Junsei Kagaku K.K.):

| | |
|---|---|
| Multifunctional monomer (dipentaerythritol hexaacrylate, M-400, manufactured by Toa Gosei Chemical Industry Co., Ltd., molecular weight/functional group = 117) | 40 parts |
| Photo-curing initiator (2-hydroxy-2-methyl-1-phenylpropane-1-one, Darocure 1173, trade name, manufactured by Ciba-Geigy Ltd.) | 2 parts |
| Smectic liquid crystal (S-6, manufactured by BDH) | 60 parts |
| Surface-active agent (Fluorad FC-430, trade name, manufactured by Sumitomo 3M) | 3 parts |

Immediately after the coating process, the wet coating was dried for 3 minutes at 50° C. and then vacuum-dried for 3 minutes at 50° C. Immediately thereafter, the dry film was irradiated with UV light at 600 mJ/cm² to cure the resin material, thereby preparing an information recording layer having a thickness of 6 μm. The information recording layer was white and opaque.

A cross-section of the information recording layer was dried after the liquid crystal was extracted with hot methanol, and then the internal structure of the information recording layer was observed with a scanning electron microscope (S-800, manufactured by Hitachi, Ltd.; magnification of 10,000). As a result, it was revealed that the surface of the information recording layer was covered with the ultraviolet curing resin material having a thickness of 0.6 μm and the inside of the layer was filled with resin particles having a particle diameter of 0.1 μm.

Further, the surface of the information recording layer was coated by spin coating with a solution prepared by dissolving 1 part of a photo-curing initiator (2-hydroxy-2-methyl-1-phenylpropane-1-one, Darocure 1173, trade name, manufactured by Ciba-Geigy Ltd.) in 10 parts of a multifunctional monomer (dipentaerythritol hexaacrylate, M-400, manufactured by Toa Gosei Chemical Industry Co., Ltd.). The coating was irradiated with UV light at 300 mJ/cm² to form a resin layer having a thickness of 1 μm.

When the pencil hardness of the information recording layer with the resin layer formed thereon was measured, it was 2 H under a load of 1,000 g. The pencil hardness of an information recording layer having no resin layer stacked thereon was 2B. Thus, it was revealed that the hardness of such an information recording layer was insufficient.

Next, an ITO film having a thickness of 500 Å was formed as a transparent electrode on the resin layer, thereby preparing a fourth information recording medium of the present invention.

Then, the information recording medium was subjected to exposure with the photoconductive layer-side electrode used as a positive electrode and the information recording layer-side electrode as a negative electrode. As a method of exposing the information recording medium, outdoor, daylight object photography was carried out using an ordinary camera under the application of a voltage of 600 V with f=1.4 and a shutter speed of 1/60 sec. After the exposure, the information recording medium was taken out. It was possible to directly view a noiseless image having gradation. In addition, the information recording medium was not damaged when subjected to reading with a scanner using a CCD line sensor. Further, the read information was output by a sublimation transfer printer. As a result, a hard copy with gradation and of high resolution was obtained.

As a comparative example, an information recording medium was prepared in the same way as the above-described fourth information recording medium except that the electrode layer was formed directly on the information recording layer without forming a resin layer. The surface of the information recording layer of this information recording medium had no sufficiently high hardness, and hence the medium was inferior in storage properties.

Next, the fifth and sixth information recording mediums of the present invention will be explained. FIG. 7(a) is a sectional view schematically showing the fifth information recording medium of the present invention. In the figure, reference numeral 3 denotes an information recording medium, 11 an information recording layer, 13 an electrode layer, and 15 a substrate.

The information recording layer 11 in the fifth information recording medium has a structure which includes a liquid crystal phase containing a dichroic dye, and a resin phase. It is possible to use the same liquid crystal materials as those described for the first information recording medium.

It is preferable to select a dichroic dye which dissolves in the liquid crystal used so as to be present in the liquid crystal phase and which does not substantially dissolve in the resin material. The dichroic dye changes its absorbance by the alignment of the dye molecular axes caused by the action of an electric field. Specific examples of dichroic dyes usable in the present invention include the following dichroic dyes manufactured by Mitsui Toatsu Chemicals Inc.: SI=486 (maximum absorption wavelength $\lambda_{max}$=406 nm in ZLI-1840, $\lambda_{max}$=397 nm in toluene; the same is the case with the following dichroic dyes), SI-209 ($\lambda_{max}$=450 nm, 432 nm), M-710 ($\lambda_{max}$=468 nm, 445 nm), M-570 ($\lambda_{max}$=451 nm, 433 nm), M-361 ($\lambda_{max}$=477 nm, 474 nm), M-86 ($\lambda_{max}$=514 nm, 510 nm, $\lambda_{max}$=552 nm, 547 nm), M-370 ($\lambda_{max}$=519 nm, 514 nm, $\lambda_{max}$=555 nm, 558 nm), SI-455 ($\lambda_{max}$=522 nm, 495 nm), SI-426 ($\lambda_{max}$=525 nm, 504 nm), M-618 ($\lambda_{max}$=544 nm, 527 nm), SI-252 ($\lambda_{max}$=572 nm, 550 nm), M-777 ($\lambda_{max}$=577 nm, 552 nm), S-432 ($\lambda_{max}$=575 nm, 552 nm), SI-512 ($\lambda_{max}$=587 nm, 580 nm), M-137 ($\lambda_{max}$=594 nm, 586 nm, $\lambda_{max}$=639 nm, 623 nm), M-141 ($\lambda_{max}$=594 nm, 586 nm, $\lambda_{max}$=639 nm, 623 nm), M-483 ($\lambda_{max}$=594 nm, 586 nm, $\lambda_{max}$=640 nm, 623 nm), M-412 ($\lambda_{max}$=593 nm, 585 nm, $\lambda_{max}$=639 nm, 629 nm), M-34 ($\lambda_{max}$=593 nm, 585 nm, $\lambda_{max}$=640 nm, 629 nm), SI-497 ($\lambda_{max}$=665 nm, 658 nm), SI-501 ($\lambda_{max}$=675 nm, 665 nm), M-403 ($\lambda_{max}$=680 nm, 678 nm), S-344 ($\lambda_{max}$=598 nm, 510 nm), S-416 ($\lambda_{max}$=625 nm, 507 nm), S-426 ($\lambda_{max}$=505 nm, 505 nm), S-428 ($\lambda_{max}$=505 nm, 508 nm, $\lambda_{max}$=608 nm, 530 nm, $\lambda_{max}$=587 nm, 574 nm, $\lambda_{max}$=$^{632}$ nm, 622 nm), S-429 ($\lambda_{max}$=486 nm, 486 nm, $\lambda_{max}$=540 nm, 534 nm, $\lambda_{max}$=587 nm, 575 nm, $\lambda_{max}$=632 nm, 620 nm), S-435 ($\lambda_{max}$=460 nm, 449 nm, $\lambda_{max}$=582 nm, 580 nm, $\lambda_{max}$=636 nm, 622 nm), and S-441 ($\lambda_{max}$=474 nm, 467nm, $\lambda_{max}$=589 nm, 583 nm, $\lambda_{max}$=633 nm, 620 nm).

It is also possible to use the following dichroic dyes manufactured by Nippon Kayaku Co., Ltd.: LCD-102 ($\lambda_{max}$=645 nm in xylene; the same is the case with the following dichroic dyes), LCD-105($\lambda_{max}$=680 nm), LCD-109 ($\lambda_{max}$=760 nm), LCD-116 ($\lambda_{max}$=670 nm), LCD-118 ($\lambda_{max}$=630 nm), LCD-121 ($\lambda_{max}$=630 nm), LCD-122($\lambda_{max}$=680 nm), LCD-204 ($\lambda_{max}$=520 nm), LCD-208 ($\lambda_{max}$=530 nm), LCD-209 ($\lambda_{max}$=595 nm (550 nm)), LCD-211 ($\lambda_{max}$=595 nm (550 nm)), LCD-212 ($\lambda_{max}$=535 nm (575 nm)), LCD-213 ($\lambda_{max}$=585 nm), LCD-307 ($\lambda_{max}$=455 nm), etc.

In addition, it is also possible to use dichroic dyes manufactured by Mitsubishi Chemical Industries, Ltd., i.e., Dye Nos. LSY-110, LSR-401, LSR-405, LSR-426, LSB-278, LSB-350, and LSB-335, and dichroic dyes manufactured by Sumitomo Chemical Co., Ltd., i.e., Dye Nos. CLD-506, CLD-513, CLD514, CLD-515, and CLD-516.

In the fifth information recording medium, it is preferable to use a dichroic dye whose maximum absorption wavelength $\lambda_{max}$ in toluene is in the range of 300 nm to 500 nm. It should be noted that in the information recording layer of the sixth information recording medium (described later), it is preferable to use a dichroic dye whose maximum absorption wavelength $\lambda_{max}$ in toluene is in the range of 600 nm to 900 nm because it is useful to use the sixth information recording medium in the near-infrared region.

It is preferable to use a dichroic dye in the proportion of 0.001% to 5% by weight, more preferably 0.01% to 1% by weight, to the liquid crystal. If the amount of dichroic dye used is excessively large, although the contrast is increased, the resistance of the medium lowers, making it impossible to effectively apply a voltage to the liquid crystal phase. In addition, if the amount of dichroic dye added is excessively large, the amount of dye dissolving in the resin phase (described later) increases, so that the dichroic dye cannot effectively function. The information recording layer in each of the fifth and sixth (described later) information recording mediums preferably has a volume resistivity of not lower than $1\times10^{10}$ ohm-cm, more preferably not lower than $1\times10^{11}$ ohm-cm, at room temperature.

As a material for forming the resin phase, it is possible to use the same resin materials described above in connection with the third information recording medium.

As to the solvent, any common solvent can be used. However, it is preferable to use a solvent whose relative evaporation rate for n-butyl acetate is smaller than 2, for example, hydrocarbon solvents represented by xylene, halogenated hydrocarbon solvents represented by chloroform, alcohol derivative solvents represented by methyl cellosolve, and ether solvents represented by dioxane.

As a photo-curing agent, it is possible to use the same photo-curing agents described above in connection with the first information recording medium.

It is preferable to use a liquid crystal and a resin material in such proportions that the liquid crystal content in the information recording layer is 10% to 90% by weight, more preferably 40% to 80% by weight. If the liquid crystal content is less than 10% by weight, the contrast ratio is low even when the molecules in the liquid crystal phase are aligned-by information recording, whereas, if the liquid crystal content exceeds 90% by weight, unfavorable phenomena such as oozing of the liquid crystal occur, causing unevenness of the recorded image.

The electrode layer 13 and the substrate 15 are formed by using the same materials as those described above in connection with the first information recording medium.

It should be noted that when the recorded information is reproduced by transmitted light, the substrate 15 must be transparent. In such a case, anti-reflection properties may be imparted to the substrate by stacking a layer having anti-reflection effect on the surface of the substrate 15 which is remote from the electrode layer 13, or by adjusting the thickness of the transparent substrate to a level at which anti-reflection effect is obtainable, or by combining together these two measures, according to need.

The information recording layer is formed by coating a mixed solution containing a resin material, a liquid crystal and a dichroic dye on the electrode and then curing the coated material. A fluorocarbon surface-active agent may be added to the mixed solution for the purpose of maintaining the wetting properties with respect to the electrode layer and forming a skin layer made only of the resin material on the surface of the information recording layer. Examples of fluorocarbon surface-active agents usable for this purpose are the same as those described above in connection with the first information recording medium. The fluorocarbon surface-active agent is used in the proportion of 0.1% to 20% by weight to the total amount of liquid crystal, resin material and dichroic dye used. If necessary, a leveling agent may be added to the mixed solution to improve the coatability of the solution and to thereby obtain excellent surface properties.

The information recording layer is formed by the same method as that employed to form the information recording layer of the first information recording medium except that the a dichroic dye is contained in the coating solution.

Next, a method of recording information on the fifth information recording medium of the present invention will be explained.

Information recording may be effected by using a photoelectric sensor, heat, laser, corona charging or other similar recording method. However, it is preferable to effect information recording by using a photoelectric sensor. It is possible to use the same photoelectric sensor as that used to effect information recording on the first information recording medium.

The system for recording information on the first information recording medium, which incorporates a photoelectric sensor, is similar to the information recording system for the first information recording medium, which is shown in FIG. 2. The information input method is also similar to that for the first information recording medium.

Electrostatic information recorded on the information recording medium is reproduced by a method similar to the method of reproducing information from the first information recording medium. When information is reproduced by transmitted light, as shown in FIG. 3, in the information recording region, light A is transmitted because the liquid crystal and the dichroic dye are aligned in the direction of the electric field, whereas, in the region where no information has been recorded, light B is scattered, thus providing a contrast with the information recording region. Since the information recording layer contains a dichroic dye, the reproduced information is superior in contrast. Information that is recorded by the liquid crystal alignment is visible information which can be read by visual observation using transmitted light, and it can also be read in the form of an enlarged image by using a projector. When laser scanning or CCD is used to read the recorded information by transmitted light, the information can be read with high accuracy. It should be noted that occurrence of scattered light can be prevented by using a Schlieren optical system, if necessary.

It is also possible to read the recorded information by reflected light. When the contrast is a matter of great concern, a reflecting layer should be provided on any of the layers.

Next, the sixth information recording medium of the present invention will be explained. The sixth information recording medium is formed by incorporating a photoconductive layer into the fifth information recording medium of the present invention. It does not need a photoelectric sensor or the like for information recording, but the information recording medium is capable of information recording by itself.

FIG. 7(b) is a sectional view schematically showing the sixth information recording medium. In the figure, reference numeral 3 denotes an information recording medium, 11 an information recording layer, 13 and 13" electrode layers, 14 a photoconductive layer, and 15 a substrate.

The electrode layer 13" and the photoconductive layer 14 are similar to the electrode layer 13" and the photoconductive layer 14, which have been described in connection with the third information recording medium. Either or both sides of each of the electrode layers 13, 13" and the substrate 15 must be transparent.

Further, the arrangement may be such that the photoconductive layer 14 is provided on the electrode layer 13" through a charge injection control layer in the same way as in the case of the third information recording medium.

Next, the information recording layer 11, which is similar to that described in connection with the third information recording medium, is stacked on the photoconductive layer 14 in the same way as in the case of the third information recording medium.

It should be noted that since the information recording layer of the sixth information recording medium is free from oozing of the liquid crystal from the information recording layer surface, the electrode layer 13 can be formed directly on the information recording layer surface by sputtering. Thus, it is possible to form an electrode layer which is free from a lowering of the electrical conductivity.

The electrode layer 13 may be formed by using a material similar to that used for the electrode layer of the first information recording medium. Since the surface of the information recording layer is formed with a skin layer made only of a resin material, if an ITO film, for example, is stacked to a thickness of 1,000 Å by sputtering or other similar method, it is possible to form an electrode which will not be cracked. It should be noted that a substrate may be stacked on the electrode 13.

Further, in the sixth information recording medium a transparent insulating layer, which is similar to the transparent insulating layer described in connection with the fourth information recording medium, may be provided between the photoconductive layer 14 and the information recording layer 11. Alternatively, a dielectric mirror layer may be provided.

The information recording and reproducing method for the sixth information recording medium of the present invention will be explained. FIG. 8 is a view for explanation of the method of recording information on the sixth information recording medium of the present invention.

When information light 18 is incident on the information recording medium with a voltage applied between the electrodes 13 and 13', photocarriers are generated in the photoconductive layer 14 at the region where the light is incident, and the photocarriers move by the action of an electric field formed by the two electrodes 13 and 13', causing redistribution of the voltage. As a result, the liquid crystal phase and the dichroic dye in the information recording layer 11 are aligned in the pattern of information light 18, thereby recording the desired information. It should be noted that it is also possible to apply a voltage for a predetermined time with the information light 18 being made incident on the information recording medium.

In addition, since the operating voltage and its range differ among liquid crystals, when the level of applied voltage and voltage application time are to be set, it is preferable to properly set the voltage distribution in the information recording medium so that the voltage distributed to the information recording layer will fall in the operating voltage range of the liquid crystal used.

The information recording method of the present invention enables planar analog recording and makes it possible to obtain recording at the liquid crystal particle level and hence high resolution, and it also permits the exposure light pattern to be retained in the form of a visible image by the molecular alignment in the liquid crystal phase.

To input information to this information recording medium, it is possible to adopt a method similar to the above-described information input method for the first information recording medium of the present invention. The information recorded on the sixth information recording medium may be reproduced by a method similar to that in the case of the third information recording medium, which is shown in FIG. 6.

The fifth and sixth information recording mediums are cut into an appropriate size in the width direction of the layers according to each particular use application. Accordingly, the interior of the information recording layer is exposed at each cut surface, so that the liquid crystal phase may ooze out during storage. If the oozing phenomenon occurs, accurate information recording cannot be effected at the end portions of the information recording medium. To prevent the occurrence of this problem, it is preferable to stack a resin layer similar to the above on each cut surface by coating or laminating after the information recording medium has been cut into an appropriate configuration, thereby protecting the cut surfaces.

The fifth and sixth information recording mediums are designed to record electrostatic information in a visible form by the liquid crystal alignment. By properly selecting a combination of a liquid crystal and a resin material, these information recording mediums are endowed with memory effect that makes it possible to retain information that has once been recorded in a visible form by the liquid crystal alignment. The recorded information can be erased by heating the medium to a high temperature near the isotropic phase transition temperature. Thus, the medium can be reused for information recording.

The fifth and sixth information recording mediums of the present invention will be explained below more specifically by way of Examples 6 to 10 and Comparative Examples 2 and 3. In these Examples, the term "parts" means parts by weight, and "%" means per cent by weight.

EXAMPLE 6

The following constituent materials were dissolved in xylene (special grade chemical, manufactured by Junsei

| | |
|---|---|
| Smectic liquid crystal<br>(S-6, manufactured by Merck & Co., Ltd.) | 5 parts |
| Nematic liquid crystal<br>(E-31LV, manufactured by Merck & Co., Ltd.) | 0.5 parts |
| Ultraviolet curing resin<br>(M-400, manufactured by Toa Gosei Chemical Industry Co., Ltd.) | 4.5 parts |
| Photo-curing initiator<br>(Darocure 1173, manufactured by Ciba-Geigy Ltd.) | 0.25 parts |
| Dichroic dye<br>(SI-486 (azo dye), manufactured by Mitsui Toatsu Chemicals Inc.) | 0.01 parts |
| Surface-active agent<br>(Fluorad FC-430, manufactured by Sumitomo 3M) | 0.1 parts |

The resulting solution was coated by using a spinner (10 sec.; 300 rpm) on the electrode side of a glass substrate (1.1 mm in thickness) having an ITO electrode formed thereon to a thickness of 1,000 Å by sputtering. The glass substrate thus coated was allowed to stand for 3 minutes in a vacuum dryer at 47° C. Thereafter, the vacuum dryer was evacuated for 2 minutes and then returned to the normal pressure state, thereby removing the solvent.

Next, the dry film was irradiated with ultraviolet rays at 600 mJ/cm$^2$ to cure the resin material, thereby preparing an information recording medium having an information recording layer of 6 μm in thickness. The transmittance of the medium at 600 nm was 38%, and the volume resistivity at room temperature was 2×10$^{11}$ ohm-cm.

A cross-section of the information recording layer was dried after the liquid crystal was extracted with hot methanol, and then the internal structure of the information recording layer was observed with a scanning electron microscope (S-800, manufactured by Hitachi, Ltd.; magnification of 10,000). As a result, it was revealed that the surface of the information recording layer was covered with the ultraviolet curing resin material having a thickness of 0.6 μm and the inside of the layer had a structure in which the liquid crystal phase that formed a continuous layer was filled with the resin particle phase having a particle diameter of 0.1 μm.

EXAMPLE 7

The following constituent materials were dissolved in xylene (special grade chemical, manufactured by Junsei Kagaku K.K.) to prepare a 50% coating solution:

| | |
|---|---|
| Smectic liquid crystal<br>(S-6, manufactured by Merck & Co., Ltd.) | 5 parts |
| Nematic liquid crystal<br>(E-31LV, manufactured by Merck & Co., Ltd.) | 0.5 parts |
| Ultraviolet curing resin<br>(M-400, manufactured by Toa Gosei Chemical Industry Co., Ltd.) | 4.5 parts |
| Photo-curing initiator<br>(Darocure 1173, manufactured by Ciba-Geigy Ltd.) | 0.25 parts |
| Dichroic dye<br>(M-34 (anthraquinone dye), manufactured by Mitsui Toatsu Chemicals Inc.) | 0.01 parts |
| Surface-active agent<br>(Fluorad FC-430, manufactured by Sumitomo 3M) | 0.1 parts |

The resulting solution was coated by using a spinner (10 sec.; 300 rpm) on the electrode side of a glass substrate (1.1 mm in thickness) having an ITO electrode formed thereon to a thickness of 1,000 Å by sputtering. The glass substrate thus coated was allowed to stand for 3 minutes in a vacuum dryer at 47° C. Thereafter, the vacuum dryer was evacuated for 2 minutes and then returned to the normal pressure state, thereby removing the solvent.

Next, the dry film was irradiated with ultraviolet rays at 600 mJ/cm$^2$ to cure the resin material, thereby preparing an information recording medium having an information recording layer of 6 μm in thickness. The transmittance of the medium at 600 nm was 42%, and the volume resistivity at room temperature was 2×10$^{11}$ ohm-cm.

EXAMPLE 8

The following constituent materials were dissolved in xylene (special grade chemical, manufactured by Junsei Kagaku K.K.) to prepare a 50% coating solution:

| | |
|---|---|
| Smectic liquid crystal (S-6, manufactured by Merck & Co., Ltd.) | 5 parts |
| Nematic liquid crystal (E-31LV, manufactured by Merck & Co., Ltd.) | 0.5 parts |
| Ultraviolet curing resin (M-400, manufactured by Toa Gosei Chemical Industry Co., Ltd.) | 4.5 parts |
| Photo-curing initiator (Darocure 1173, manufactured by Ciba-Geigy Ltd.) | 0.25 parts |
| Dichroic dye (SI-486 (azo dye), manufactured by Mitsui Toatsu Chemicals Inc.) | 0.03 parts |
| Surface-active agent (Fluorad FC-430, manufactured by Sumitomo 3M) | 0.1 parts |

The resulting solution was coated by using a spinner (10 sec.; 300 rpm) on the electrode side of a glass substrate (1.1 mm in thickness) having an ITO electrode formed thereon to a thickness of 1,000 Å by sputtering. The glass substrate thus coated was allowed to stand for 3 minutes in a vacuum dryer at 47° C. Thereafter, the vacuum dryer was evacuated for 2 minutes and then returned to the normal pressure state, thereby removing the solvent.

Next, the dry film was irradiated with ultraviolet rays at 600 mJ/cm$^2$ to cure the resin material, thereby preparing an information recording medium having an information recording layer of 6 μm in thickness. The transmittance of the medium at 600 nm was 25%, and the volume resistivity at room temperature was 1×10$^{11}$ ohm-cm.

Comparative Example 2

The following constituent materials were dissolved in xylene (special grade chemical, manufactured by Junsei Kagaku K.K.) to prepare a 50% coating solution:

| | |
|---|---|
| Smectic liquid crystal (S-6, manufactured by Merck & Co., Ltd.) | 5 parts |
| Nematic liquid crystal (E-31LV, manufactured by Merck & Co., Ltd.) | 0.5 parts |
| Ultraviolet curing resin (M-400, manufactured by Toa Gosei Chemical Industry Co., Ltd.) | 4.5 parts |
| Photo-curing initiator (Darocure 1173, manufactured by Ciba-Geigy Ltd.) | 0.25 parts |
| Surface-active agent (Fluorad FC-430, manufactured by Sumitomo 3M) | 0.1 parts |

The resulting solution was coated by using a spinner (10 sec.; 300 rpm) on the electrode side of a glass substrate (1.1 mm in thickness) having an ITO electrode formed thereon to a thickness of 1,000 Å by sputtering. The glass substrate thus coated was allowed to stand for 3 minutes in a vacuum dryer at 47° C. Thereafter, the vacuum dryer was evacuated for 2 minutes and then returned to the normal pressure state, thereby removing the solvent.

Next, the dry film was irradiated with ultraviolet rays at 600 mJ/cm$^2$ to cure the resin material, thereby preparing an information recording medium having an information recording layer of 6 μm in thickness. The transmittance of the medium at 600 nm was as high as 46%, although the volume resistivity at room temperature was 2×10$^{11}$ ohm-cm. Thus, it will be understood that when no dichroic dye is contained, the transmittance becomes high.

Comparative Example 3

The following constituent materials were dissolved in xylene (special grade chemical, manufactured by Junsei Kagaku K.K.) to prepare a 50% coating solution:

| | |
|---|---|
| Smectic liquid crystal (S-6, manufactured by Merck & Co., Ltd.) | 5 parts |
| Nematic liquid crystal (E-31LV, manufactured by Merck & Co., Ltd.) | 0.5 parts |
| Ultraviolet curing resin (M-400, manufactured by Toa Gosei Chemical Industry Co., Ltd.) | 4.5 parts |
| Photo-curing initiator (Darocure 1173, manufactured by Ciba-Geigy Ltd.) | 0.25 parts |
| Dichroic dye (SI-486 (azo dye), manufactured by Mitsui Toatsu Chemicals Inc.) | 1 part |
| Surface-active agent (Fluorad FC-430, manufactured by Sumitomo 3M) | 0.1 parts |

The resulting solution was coated by using a spinner (10 sec.; 300 rpm) on the electrode side of a glass substrate (1.1 mm in thickness) having an ITO electrode formed thereon to a thickness of 1,000 Å by sputtering. The glass substrate thus coated was allowed to stand for 3 minutes in a vacuum dryer at 47° C. Thereafter, the vacuum dryer was evacuated for 2 minutes and then returned to the normal pressure state, thereby removing the solvent.

Next, the dry film was irradiated with ultraviolet rays at 600 mJ/cm$^2$ to cure the resin material, thereby preparing an information recording medium having an information recording layer of 6 μm in thickness. The transmittance of the medium at 600 nm was 10%, but the volume resistivity at room temperature was as low as 5×10$^8$ ohm-cm. Thus, it will be understood that the volume resistivity lowers as the amount of dichroic dye used increases.

EXAMPLE 9

The photoelectric sensor prepared in Example 4 and the information recording medium prepared in Example 6 were disposed to face each other across an air gap of 10 μm defined by a spacer 19 of polyimide film, thereby forming a stack structure.

In an information recording system incorporating the stack structure, which was similar to that shown in FIG. 2, a DC voltage of 850 V was applied between the respective electrodes of the photoelectric sensor and the information recording medium for 0.05 sec., and at the same time, exposure was carried out by projecting a gray scale from the photoelectric sensor side for 1/30 sec. with an imaging camera (RB67, manufactured by Mamiya Camera Co., Ltd.). After the exposure, the information recording medium was taken out. When the information recording medium was observed by transmitted light, the transmittance in the light-transmitting portions was 90%, and record regions comprising the light-transmitting portions corresponding to the gray scale were observed.

Next, the information recorded on the information recording medium was read with a film scanner (LS-3500, manufactured by Nikon Corporation), and the read information was output by using a sublimation transfer printer (SP-5500, manufactured by JVC). As a result, a favorable print corresponding to the gray scale was obtained.

EXAMPLE 10

On a glass substrate having a thickness of 1.1 mm and thoroughly cleaned, an ITO film having a thickness of 1,000 Å was deposited by EB evaporation to obtain an electrode layer.

The surface of the electrode was coated with a coating solution by using a blade coater having a gap of 2 mil. The coating solution was prepared as follows: 3 parts by weight of a fluorenone-azo pigment (manufactured by Nihon Kanko Shikiso K.K.) having the following structure as a charge generating substance and 1 part by weight of a polyester resin material (Vylon 200, manufactured by Toyobo Co., Ltd.) were thoroughly dispersed in a paint shaker with a mixed solvent comprising 1,4-dioxane and cyclohexane in the ratio of 1:1 to prepare a 100 g solution in which the solid matter content was 2% by weight:

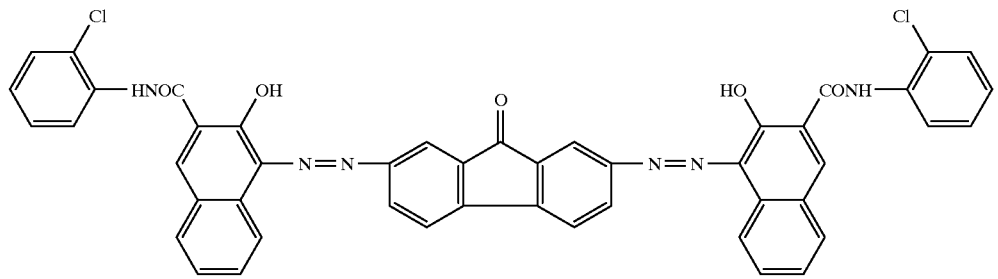

Thereafter, drying was carried out for 1 hour at 100° C. Thus, a charge generation layer having a thickness of 0.3 μm was stacked on the electrode.

The surface of the charge generation layer was coated with a coating solution by using a blade coater. The coating solution was prepared by mixing together 25 parts by weight of a para-dimethyl stilbene having the following structure as a charge transport substance, 5 parts by weight of a polystyrene resin material (HRM-3, manufactured by Denki Kagaku Kogyo K.K.), 102 parts by weight of 1,1,2-trichloroethane, and 68 parts by weight of dichloromethane.

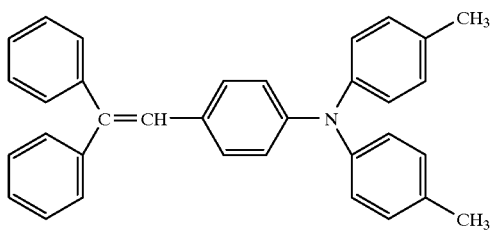

Thereafter, drying was carried out for 2 hours at 80° C., thereby stacking a charge transport layer on the charge generation layer, and thus providing a photoconductive layer of 20 μm in thickness which included charge generation and transport layers.

Next, the surface of the photoconductive layer was coated by a spinner (1500 rpm; 20 sec) with a solution of 4.5% a fluorocarbon resin (Cytop, trade name, manufactured by Asahi Glass Company, Ltd., having a water absorption of 0.01% and a resistivity of $1 \times 10^{18}$ ohm-cm) in perfluoro(2-butyl tetrahydrofuran), and it was dried for 1 hour at 80° C., thereby obtaining a transparent insulating layer having a thickness of 0.8 μm.

Next, the surface of the transparent insulating layer was coated by using a spinner (10 sec.; 300 rpm) with a 50% coating solution prepared by dissolving the following constituent materials in xylene (special grade chemical, manufactured by Junsei Kagaku K.K.):

| | |
|---|---|
| Smectic liquid crystal | 5 parts |
| (S-6, manufactured by Merck & Co., Ltd.) | |
| Nematic liquid crystal | 0.5 parts |
| (E-31LV, manufactured by Merck & Co., Ltd.) | |
| Ultraviolet curing resin | 4.5 parts |
| (M-400, manufactured by Toa Gosei Chemical Industry Co., Ltd.) | |
| Photo-curing initiator | 0.25 parts |
| (Darocure 1173, manufactured by Ciba-Geigy Ltd.) | |
| Dichroic dye | 0.01 parts |
| (M-403 (anthraquinone dye), manufactured by Mitsui Toatsu Chemicals Inc.) | |

-continued

| | |
|---|---|
| Surface-active agent | 0.1 parts |
| (Fluorad FC-430, manufactured by Sumitomo 3M) | |

The glass substrate thus coated was allowed to stand for 3 minutes in a vacuum dryer at 47° C. Thereafter, the vacuum dryer was evacuated for 2 minutes and then returned to the normal pressure state, thereby removing the solvent. Next, the dry film was irradiated with ultraviolet rays at 600 mJ/cm² to cure the resin material, thereby stacking an information recording layer of 6 μm in thickness on the transparent insulating layer.

Next, an ITO film having a thickness of 500 Å was formed as an upper electrode on the information recording layer by sputtering, thereby preparing a sixth information recording medium according to the present invention. The transmittance of the information recording medium for light of 800 nm was 60%.

As a comparative example, an information recording medium was prepared in the same way as the above except that no dichroic dye was added thereto. The transmittance of this information recording medium for light of 800 nm was 64%. Thus, it will be understood that the transmittance is high when no dichroic dye is added to the medium.

The information recording medium thus formed was subjected to exposure, as shown in FIG. 8. With a DC voltage of 600 V applied between the photoconductive layer-side electrode as a positive electrode and the information recording layer-side electrode as a negative electrode, exposure was carried out for 0.1 sec. from the photoconductive layer side by using a 1,000 lux halogen lamp as a light source. After the exposure, the information recording medium was taken out.

After the information recording, the transmittance for light of 800 nm was 90%. Similar information recording was carried out for an information recording medium having no dichroic dye added thereto, and the transmittance for light of 800 nm was similarly measured. The transmittance of this information recording medium was 90%. However, it will be clear from comparison between the transmittances of these two information recording mediums before the information recording that the information recording medium of the present invention has a higher contrast than that of the information recording medium having no dichroic dye added thereto.

What we claim is:

1. An information recording and reproducing method comprising the steps of:

preparing an information recording medium having an electrode layer, and an information recording layer provided on said electrode layer including a liquid crystal phase and an ultraviolet curing resin phase and having a structure in which the liquid crystal phase is filled with ultraviolet curing resin particles, said information recording layer being formed by coating a surface of said electrode layer with a mixed solution of a liquid crystal, a multifunctional ultraviolet curing resin material whose parameter, which is expressed by an average molecular weight divided by an average functional group, is not larger than 160, and a fluorocarbon surface-active agent, and then curing said coating by irradiation with ultraviolet rays, thereby forming an ultraviolet curing resin skin layer having no liquid crystal phase on an outer surface of said information recording layer;

disposing said information recording medium to face a photoelectric sensor having a photoconductive layer provided on an electrode layer, either in or out of contact with each other, thereby forming an information recording system;

applying information light for exposure to said information recording system with a voltage applied between the respective electrode layers of said information recording medium and said photoelectric sensor, thereby aligning the liquid crystal molecules in said liquid crystal phase in accordance with the applied information light, and thus effecting information recording; and reproducing the recorded information as visible information by transmitted or reflected light.

2. An information recording and reproducing method comprising the steps of:

preparing an information recording medium having a first electrode layer, an information recording layer provided on said first electrode layer including a liquid crystal phase and an ultraviolet curing resin phase having a structure in which the liquid crystal phase is filled with ultraviolet curing resin particles, and a second electrode layer provided on said information recording layer, at least one of said electrode layers being formed on said information recording layer by vapor deposition, and said information recording layer being formed by coating a surface of said electrode layer with a mixed solution of a liquid crystal, a multifunctional ultraviolet curing resin material whose parameter, which is expressed by an average molecular weight divided by an average functional group, is not larger than 160, and a fluorocarbon surface-active agent, and then curing said coating by irradiation with ultraviolet rays, thereby forming an ultraviolet curing resin skin layer having no liquid crystal phase on an outer surface of said information recording layer;

applying a voltage in a pattern between said two electrode layers, thereby aligning the liquid crystal molecules in said liquid crystal phase in the pattern of said applied voltage, and thus effecting information recording; and reproducing the recorded information as visible information by transmitted or reflected light.

3. An information recording and reproducing method comprising the steps of:

preparing an information recording medium having a first electrode layer, a photoconductive layer, an information recording layer, a resin layer, and a second electrode layer, which are successively provided one on top of another, at least one of said electrode layers being transparent, and said information recording layer including a liquid crystal phase and a resin phase and having a structure in which the liquid crystal phase is filled with resin particles;

carrying out pattern exposure while applying a voltage between said two electrode layers, thereby aligning the liquid crystal molecules in said liquid crystal phase in said pattern, and thus effecting information recording; and reproducing the recorded information as visible information by transmitted or reflected light.

4. An information recording and reproducing method comprising, the steps of:

preparing an information recording medium having a first electrode layer, a photoconductive layer, an insulating layer, an information recording layer, a resin layer, and a second electrode layer, which are successively provided one on top of another, at least one of said electrode layers being transparent, and said information recording layer including a liquid crystal phase and a resin phase and having a structure in which the liquid crystal phase is filled with resin particles;

carrying out pattern exposure while applying a voltage between said two electrode layers, thereby aligning the liquid crystal molecules in said liquid crystal phase in said pattern, and thus effecting information recording; and reproducing the recorded information as visible information by transmitted or reflected light.

5. An information recording and reproducing method comprising the steps of:

preparing an information recording medium having an electrode layer, and an information recording layer provided on said electrode layer including a liquid crystal phase and a resin phase and having a structure in which the liquid crystal phase is filled with resin particles, said liquid crystal phase containing a dichroic dye;

disposing said information recording medium to face a photoelectric sensor having a photoconductive layer provided on an electrode layer, either in or out of contact with each other, thereby forming an information recording system;

applying information light for exposure to said information recording system with a voltage applied between the respective electrode layers of said information recording medium and said photoelectric sensor, thereby aligning the liquid crystal molecules in said liquid crystal phase in accordance with the applied information light, and thus effecting information recording; and reproducing the recorded information as visible information by transmitted or reflected light.

6. An information recording and reproducing method comprising the steps of:

preparing an information recording medium having a first electrode layer, a photoconductive layer, an information recording layer, and a second electrode layer, which are successively provided one on top of another, at least one of said electrode layers being transparent, and said information recording layer including a liquid crystal phase and a resin phase and having a structure in which the liquid crystal phase is filled with resin particles, said liquid crystal phase containing a dichroic dye;

carrying out pattern exposure while applying a voltage between said two electrode layers, thereby aligning the liquid crystal molecules in said liquid crystal phase in said pattern, and thus effecting information recording; and reproducing the recorded information as visible information by transmitted or reflected light.

* * * * *